US012063910B2

(12) United States Patent
Mott et al.

(10) Patent No.: US 12,063,910 B2
(45) Date of Patent: Aug. 20, 2024

(54) SYSTEM, METHOD, AND APPARATUS FOR TRACKING AND MONITORING PET ACTIVITY

(71) Applicant: Mars, Incorporated, McLean, VA (US)

(72) Inventors: Robert Mott, San Francisco, CA (US); Shao En Huang, San Francisco, CA (US); Russ Ward Smith, San Francisco, CA (US)

(73) Assignee: MARS, INCORPORATED, McLean, VA (US)

( * ) Notice: Subject to any disclaimer, the term of this patent is extended or adjusted under 35 U.S.C. 154(b) by 36 days.

(21) Appl. No.: 17/525,335

(22) Filed: Nov. 12, 2021

(65) Prior Publication Data

US 2022/0151207 A1 May 19, 2022

Related U.S. Application Data

(60) Provisional application No. 63/113,670, filed on Nov. 13, 2020.

(51) Int. Cl.
| | | |
|---|---|---|
| *A01K 29/00* | (2006.01) | |
| *A01K 11/00* | (2006.01) | |
| *A01K 27/00* | (2006.01) | |
| *G06F 1/3231* | (2019.01) | |

(52) U.S. Cl.
CPC .......... *A01K 29/005* (2013.01); *A01K 11/008* (2013.01); *A01K 27/009* (2013.01); *G06F 1/3231* (2013.01)

(58) Field of Classification Search
CPC .. A01K 27/001; A01K 27/009; A01K 29/005; A01K 15/021; A01K 11/008; A01K 11/006

USPC .................................................. 119/858, 863
See application file for complete search history.

(56) References Cited

U.S. PATENT DOCUMENTS

| | | | |
|---|---|---|---|
| 1,242,159 | A | 10/1917 | Dunkleberger |
| 1,271,650 | A | 7/1918 | Arkin |
| 1,380,177 | A | 5/1921 | Louis |
| 1,402,827 | A | 1/1922 | Louis |

(Continued)

FOREIGN PATENT DOCUMENTS

| | | |
|---|---|---|
| CN | 102833675 A | 12/2012 |
| CN | 105981418 A | 9/2016 |

(Continued)

OTHER PUBLICATIONS

U.S. Appl. No. 62/768,414, filed Nov. 16, 2018, Mott.

(Continued)

*Primary Examiner* — Peter M Poon
*Assistant Examiner* — Jeffrey R Larsen
(74) *Attorney, Agent, or Firm* — Baker Botts L.L.P.

(57) ABSTRACT

A system, method, or apparatus for tracking and monitoring pet activity. The apparatus can be a wearable device for a pet comprising a band comprising a strap plate, a removable battery component, and a tracking component, wherein the removable battery component can be configured to be removably attached to the tracking component, wherein the wearable device can be removably attached to the pet via the band, and wherein the tracking component can be removably attached to the strap plate.

20 Claims, 14 Drawing Sheets

(56) References Cited

U.S. PATENT DOCUMENTS

| | | |
|---|---|---|
| 1,754,200 A | 4/1930 | Janes |
| 1,839,896 A | 1/1932 | Theodore |
| 2,364,266 A | 12/1944 | Edward |
| 3,251,110 A | 5/1966 | John |
| 3,477,409 A | 11/1969 | Costanzo |
| 3,782,017 A | 1/1974 | Graham |
| D242,675 S | 12/1976 | McNair |
| 4,208,986 A | 6/1980 | Costanzo |
| 4,318,234 A | 3/1982 | Charles et al. |
| D264,260 S | 5/1982 | Terino |
| 4,742,503 A | 5/1988 | Braun et al. |
| 4,748,938 A | 6/1988 | Owen |
| 4,802,482 A | 2/1989 | Gonda et al. |
| 4,809,700 A | 3/1989 | Castelli et al. |
| D300,678 S | 4/1989 | Barrault |
| 4,821,424 A | 4/1989 | Loggins |
| 4,881,492 A | 11/1989 | Jones |
| 4,940,020 A | 7/1990 | Gordon |
| D337,411 S | 7/1993 | Smith |
| D349,864 S | 8/1994 | Dunlap et al. |
| 5,473,830 A | 12/1995 | Doble |
| 5,603,094 A | 2/1997 | Greear |
| 5,623,731 A | 4/1997 | Ehrgott et al. |
| D410,206 S | 5/1999 | Slater |
| 6,003,473 A * | 12/1999 | Printz .................. A01K 27/009 119/859 |
| 6,202,599 B1 | 3/2001 | Cutler |
| D444,599 S | 7/2001 | Guerry, Jr. |
| D445,352 S | 7/2001 | So |
| 6,314,058 B1 | 11/2001 | Lee |
| D454,991 S | 3/2002 | Muller |
| D460,221 S | 7/2002 | Sloot |
| D464,941 S | 10/2002 | Latto et al. |
| D471,678 S | 3/2003 | Hanna |
| D478,830 S | 8/2003 | So |
| 6,695,269 B1 | 2/2004 | Anscher |
| 6,720,879 B2 | 4/2004 | Edwards |
| 6,805,460 B1 | 10/2004 | Zoller et al. |
| 6,970,090 B1 * | 11/2005 | Sciarra ................ A01K 27/009 362/570 |
| D516,754 S | 3/2006 | Curtis |
| D521,927 S | 5/2006 | Franck et al. |
| D523,188 S | 6/2006 | Lord |
| D524,282 S | 7/2006 | Beasley et al. |
| 7,107,941 B2 | 9/2006 | Wang |
| 7,140,989 B2 | 11/2006 | Poruchny |
| D535,281 S | 1/2007 | Yang |
| D537,409 S | 2/2007 | Suzuki |
| D558,209 S | 12/2007 | Ikeda et al. |
| D565,182 S | 3/2008 | Cheng et al. |
| 7,341,561 B2 | 3/2008 | Tanaka et al. |
| D575,009 S | 8/2008 | Murrell |
| D575,289 S | 8/2008 | Kuo et al. |
| D584,176 S | 1/2009 | Maruyama et al. |
| D591,012 S | 4/2009 | Geissler |
| D592,078 S | 5/2009 | Tang |
| D592,647 S | 5/2009 | L'Henaff et al. |
| D594,404 S | 6/2009 | Kuo et al. |
| D594,874 S | 6/2009 | Sheba et al. |
| D597,676 S | 8/2009 | Copeland et al. |
| D599,241 S | 9/2009 | Andre et al. |
| D607,617 S | 1/2010 | Golenz |
| D608,277 S | 1/2010 | Cano et al. |
| D609,636 S | 2/2010 | Jensen |
| 7,705,736 B1 | 4/2010 | Kedziora |
| D618,802 S | 6/2010 | Brady et al. |
| D619,256 S | 7/2010 | Brady et al. |
| D619,308 S | 7/2010 | Roysky |
| D625,262 S | 10/2010 | Lee et al. |
| D627,718 S | 11/2010 | Houghton |
| D656,096 S | 3/2012 | Sasada et al. |
| D657,274 S | 4/2012 | Neethling |
| D663,684 S | 7/2012 | Yang |
| D663,685 S | 7/2012 | Yang |
| D667,322 S | 9/2012 | Madrack |
| D668,562 S | 10/2012 | Madrack |
| D669,027 S | 10/2012 | Kumpula et al. |
| D671,921 S | 12/2012 | Beall et al. |
| D673,110 S | 12/2012 | Sasada et al. |
| D673,334 S | 12/2012 | Guo |
| D673,908 S | 1/2013 | Koch |
| 8,353,603 B2 | 1/2013 | Berry et al. |
| 8,356,579 B2 | 1/2013 | Sullivan |
| D680,541 S | 4/2013 | Lee et al. |
| D693,814 S | 11/2013 | Park |
| D694,228 S | 11/2013 | Richter |
| D695,468 S | 12/2013 | Finlan |
| D698,376 S | 1/2014 | Funato et al. |
| D704,634 S | 5/2014 | Eidelman et al. |
| D706,321 S | 6/2014 | Oetlinger et al. |
| D709,396 S | 7/2014 | Eidelman et al. |
| D714,498 S | 9/2014 | Khubani |
| D715,675 S | 10/2014 | Ma |
| D724,971 S | 3/2015 | Bailey et al. |
| D724,991 S | 3/2015 | Oh |
| D725,511 S | 3/2015 | Read et al. |
| D725,841 S | 3/2015 | So |
| D725,850 S | 3/2015 | Eidelman et al. |
| D726,052 S | 4/2015 | Henning |
| D742,817 S | 11/2015 | Lammers-Meis et al. |
| 9,179,647 B2 | 11/2015 | Lambert |
| D744,656 S | 12/2015 | Schempp et al. |
| D744,658 S | 12/2015 | Hilkey-Boyatt |
| D745,421 S | 12/2015 | Akana et al. |
| D749,570 S | 2/2016 | Lee |
| D751,069 S | 3/2016 | Choi et al. |
| D751,549 S | 3/2016 | Park et al. |
| D752,046 S | 3/2016 | Jun |
| D761,138 S | 7/2016 | Manabe et al. |
| D769,869 S | 10/2016 | Zhou et al. |
| D772,745 S | 11/2016 | Henne et al. |
| D774,651 S | 12/2016 | Kaib et al. |
| D778,746 S | 2/2017 | Renganathan |
| D780,238 S | 2/2017 | Kato |
| D784,325 S | 4/2017 | Kim et al. |
| D788,999 S | 6/2017 | Zinn et al. |
| D794,206 S | 8/2017 | Cohrs |
| D797,100 S | 9/2017 | Wieser et al. |
| D798,861 S | 10/2017 | Wieser et al. |
| D800,085 S | 10/2017 | Shepher |
| D800,721 S | 10/2017 | Kim et al. |
| D805,938 S | 12/2017 | Park et al. |
| D806,880 S | 1/2018 | Henning |
| 9,861,080 B1 * | 1/2018 | Hathway ............... A01K 27/001 |
| D812,499 S | 3/2018 | Kuh et al. |
| D815,061 S | 4/2018 | Wei |
| D815,077 S | 4/2018 | Sibley et al. |
| D816,080 S | 4/2018 | Chen et al. |
| 9,949,459 B2 | 4/2018 | Pattie et al. |
| D816,520 S | 5/2018 | Elrod et al. |
| D816,917 S | 5/2018 | Lee et al. |
| D817,558 S | 5/2018 | Lee et al. |
| D817,559 S | 5/2018 | Lee |
| D819,633 S | 6/2018 | Jun |
| 9,986,791 B2 | 6/2018 | Botkus et al. |
| D822,516 S | 7/2018 | Van Curen et al. |
| 10,021,946 B2 | 7/2018 | Kaneko |
| D826,763 S | 8/2018 | Chuang |
| D828,189 S | 9/2018 | Benedetti |
| D828,816 S | 9/2018 | Spors et al. |
| 10,142,773 B2 | 11/2018 | Taylor et al. |
| D838,716 S | 1/2019 | Teng et al. |
| D839,753 S | 2/2019 | Domke et al. |
| D840,251 S | 2/2019 | Choi |
| D841,005 S | 2/2019 | Lin |
| D844,570 S | 4/2019 | Kornacki et al. |
| D846,748 S | 4/2019 | Benedikter |
| D848,293 S | 5/2019 | Laurans et al. |
| D850,627 S | 6/2019 | Purani et al. |
| D852,436 S | 6/2019 | Leach |
| D854,760 S | 7/2019 | Mott et al. |
| 10,376,020 B1 | 8/2019 | Doyle et al. |
| D858,904 S | 9/2019 | Zinn et al. |
| D860,989 S | 9/2019 | Choplin et al. |

(56) References Cited

U.S. PATENT DOCUMENTS

| | | |
|---|---|---|
| 10,420,401 B2 | 9/2019 | Eidelman et al. |
| D861,534 S | 10/2019 | Paik |
| D865,301 S | 10/2019 | Eidelman et al. |
| D865,546 S | 11/2019 | Kellock |
| D867,685 S | 11/2019 | Del Moral |
| 10,463,021 B2 | 11/2019 | Lee |
| D871,240 S | 12/2019 | Burns |
| D898,613 S | 10/2020 | Stapleton |
| 10,820,151 B2 | 10/2020 | Yoder et al. |
| D906,526 S | 12/2020 | Wade et al. |
| D910,187 S | 2/2021 | Benedikter |
| D911,706 S | 3/2021 | Hyun |
| D912,666 S | 3/2021 | Bournique |
| D918,071 S | 5/2021 | Nothacker et al. |
| D932,712 S | 10/2021 | Mott et al. |
| D948,137 S | 4/2022 | Bocknek et al. |
| D950,863 S | 5/2022 | Mott et al. |
| D952,961 S | 5/2022 | Li |
| D953,667 S | 5/2022 | Li |
| D965,925 S | 10/2022 | Zhu |
| D965,926 S | 10/2022 | Mo |
| D971,519 S | 11/2022 | Iyo |
| 2001/0004238 A1 | 6/2001 | Gerig |
| 2002/0010390 A1 | 1/2002 | Guice et al. |
| 2003/0094145 A1 | 5/2003 | Cheng |
| 2003/0116101 A1 | 6/2003 | Kim et al. |
| 2006/0000194 A1 | 1/2006 | Duncan et al. |
| 2006/0169222 A1 | 8/2006 | Gerig |
| 2006/0236955 A1 | 10/2006 | Lord |
| 2006/0236956 A1 | 10/2006 | Lord |
| 2007/0209604 A1 | 9/2007 | Groh et al. |
| 2007/0221140 A1 | 9/2007 | Warren et al. |
| 2008/0210176 A1 | 9/2008 | Lalor |
| 2009/0013939 A1 | 1/2009 | Santiago et al. |
| 2009/0038670 A1 | 2/2009 | Shu |
| 2009/0289844 A1* | 11/2009 | Palsgrove ............ A01K 15/021 342/357.55 |
| 2010/0154721 A1 | 6/2010 | Gerig et al. |
| 2010/0162966 A1 | 7/2010 | McFarland |
| 2011/0061605 A1* | 3/2011 | Hardi ................... A01K 27/009 340/573.3 |
| 2012/0048213 A1 | 3/2012 | Konovalov |
| 2013/0006065 A1 | 1/2013 | Yanai et al. |
| 2013/0099920 A1 | 4/2013 | Song |
| 2013/0113621 A1* | 5/2013 | So ......................... A01K 11/008 340/539.13 |
| 2014/0290013 A1* | 10/2014 | Eidelman ............... A44B 99/00 24/593.1 |
| 2015/0040839 A1* | 2/2015 | Goetzl ................. A01K 15/021 119/720 |
| 2015/0053144 A1* | 2/2015 | Bianchi ................ A01K 27/001 119/720 |
| 2015/0099472 A1 | 4/2015 | Ickovic |
| 2015/0250396 A1 | 9/2015 | Ahmed et al. |
| 2015/0251074 A1 | 9/2015 | Ahmed et al. |
| 2015/0356393 A1* | 12/2015 | Daoura .................... H04W 4/60 340/8.1 |
| 2016/0135431 A1* | 5/2016 | Sheldon .................. H02J 7/025 119/859 |
| 2016/0150857 A1 | 6/2016 | Botkus |
| 2016/0216130 A1 | 7/2016 | Abramson |
| 2016/0245500 A1* | 8/2016 | Georgi ................ F21V 33/0052 |
| 2016/0253889 A1 | 9/2016 | Keyton |
| 2016/0269868 A1 | 9/2016 | Su |
| 2016/0360733 A1 | 12/2016 | Triener |
| 2017/0079383 A1 | 3/2017 | Huang |
| 2017/0181409 A1* | 6/2017 | Tupin, Jr. .............. A61B 5/6831 |
| 2017/0208775 A1 | 7/2017 | Van Curen et al. |
| 2018/0098525 A1 | 4/2018 | Lee et al. |
| 2019/0167106 A1* | 6/2019 | Couse .................. A61B 5/6802 |
| 2019/0183094 A1 | 6/2019 | Arnett |
| 2020/0015456 A1 | 1/2020 | Van Curen et al. |
| 2020/0205381 A1* | 7/2020 | Wernimont ............. G06F 3/017 |
| 2022/0000074 A1 | 1/2022 | Mott et al. |
| 2022/0151207 A1 | 5/2022 | Mott et al. |
| 2022/0367059 A1 | 11/2022 | Mott et al. |

FOREIGN PATENT DOCUMENTS

| | | |
|---|---|---|
| CN | 304334808 | 10/2017 |
| CN | 305133577 | 4/2019 |
| CN | 305855591 | 6/2020 |
| DE | 202005013615 U1 | 11/2005 |
| EM | 007428107-0001 | 2/2020 |
| GB | 9007428099-0001 | 12/2019 |
| JP | 1602690 S | 4/2018 |
| WO | WO 2020/264360 A1 | 12/2020 |
| WO | WO 2021/087376 A1 | 5/2021 |
| WO | WO 2022/104048 A1 | 5/2022 |
| WO | WO 2022/225945 A1 | 10/2022 |

OTHER PUBLICATIONS

U.S. Appl. No. 62/867,226, filed Jun. 26, 2019, Mott, et al.
U.S. Appl. No. 62/970,575, filed Feb. 5, 2020, Mott, et al.
U.S. Appl. No. 29/758,370, filed Nov. 13, 2020.
U.S. Appl. No. 29/868,249, filed Nov. 28, 2022.
U.S. Appl. No. 29/868,251, filed Nov. 28, 2022.
U.S. Appl. No. 29/696,311 (U.S. Pat No. D950,863), filed Jun. 26, 2019 (May 3, 2022).
U.S. Appl. No. 29/696,315 (U.S. Pat No. D932,712), filed Jun. 26, 2019 (Oct. 5, 2021).
U.S. Appl. No. 29/696,311, Mar. 18, 2022 Issue Fee Payment.
U.S. Appl. No. 29/696,311, Jan. 13, 2022 Notice of Allowance.
U.S. Appl. No. 29/696,311, Aug. 17, 2021 Response to Non-Final Office Action.
U.S. Appl. No. 29/696,311, May 28, 2011 Non-Final Office Action.
U.S. Appl. No. 29/696,315, Sep. 1, 2021 Issue Fee Payment.
U.S. Appl. No. 29/696,315, Jun. 3, 2021 Notice of Allowance.
"Amazon.com, Inc. Web page, JPO's Prior Design Ref. No. HJ27044048," Date first available, Oct. 5, 2015, 7 pp.
"Whistle 3 GPS Pet Tracker & Activity, Available for sale Jun. 8, 2007 [online]," Amazon.com, [Retrieved on Jul. 1, 2018], Available from internet URL:<https://www.amazon.com/dp/b01n7mwkwy/ref=sspa_dk_detail_1?pcs=1, 9 pages.
Fi Smart Dog Collar, https://tryfi.com/, Accessed on May 7, 2021, 5 pages.
Get Rawr First: Stylishly Smart Collar to Bond with the Pet You Love, https://getrawr.com/, Accessed on May 7, 2021, 12 pages.
Link My Pet Smart Collar, https://www.linkmypet.com/, Accessed on May 7, 2021, 3 pages.
Tractive GPS Cat Tracker, https://tractive.com/en-us/pd/gps-tracker-cat, Accessed on May 7, 2021, 14 pages.
U.S. Appl. No. 29/580,756, filed Oct. 12, 2016, 6 pgs.
Whistle FIT, published 2018 [online], [retrieved on Jul. 17, 2018], Available from internet, URL: <https://www.petinsight.com/whistle-fit/>, 5 pgs.
Whistle Go—Health & Location Tracker for Pets—Waterproof GPS Pet Tracker, published Jul. 23, 2019 [online][retrieved May 17, 2021],Available from Internet, URL: https://www.amazon.com/Whistle-100-04101-00-Health-Location-Tracker/dp/B07TB5M9FC/ref=sr_1_12?dchild=1&keywords=whistle+dog&qid=1621017829&sr=8-12.
Whistle Go Explore—Ultimate Health & Location Tracker, published Jul. 23, 2019 [online][retrieved May 17, 2021], Available from Internet, URL: https://www.amazon.com/Whistle-Explore-Ultimate-Location-Tracker/dp/B07TC75SBX/ref=sr_1_1_sspa?dchild=1&keywords=whistle+whistle+dog&qid=1621017829&sr=8-1-spons&psc=spLa=ZW5jcnIwdGVkUXVhbGlmaWVyPUExWk9TWkkxTVZVN09LJmVuY3J5cHRIZElkPUEwMjg5OTU5MVpRRIQ5V1NBMSZ1bmNyeXB0ZWRBZElkPUEwOTQ4MjkxMjFBUkxNQjkwM0FCUiZ3aWRnZXROYW1lPXNwX2F0ZiZhY3Rpb249Y2xpY2tSZWRpcmVjdCZkb05vdExvZ0NsaWNrPXRydWU=.
Whistle GPS Pet Tracker, https://www.amazon.com/Whistle-100-0500-00-GPS-Pet-Tracker/dp/B015DV0O9C/ref=zg_bsnr_2975428011_4 [ 7 pgs. Accessed on Mar. 15, 2018].

(56) References Cited

OTHER PUBLICATIONS

International Search Report and Written Opinion mailed Feb. 8, 2022 in International Application No. PCT/US2021/059124.
PetSmart Collars, Change of pull (tensile) strength standards for collars, leads and harnesses, Feb. 23, 2016, 1 pg.
Amazon.com, Nuzzle Pet Activity and GPS Tracker Large Collar, Nov. 18, 2019, 11 pgs.
Link Plus Sport_Link AKC, Jan. 24, 2020, 2 pgs.
U.S. Appl. No. 29/758,370, Mar. 22, 2023 Non-Final Office Action.
"Whistle GO Explore GPS" available Jul. 23, 2019, [online], [site visited Mar. 15, 2023]. Retrieved from Internet, URL:https://www.amazon.com/Whistle-Explore-Ultimate-Location-Tracker/dp/B07TC75S8X?th=1 (2019).
"Whistle GPS—Whistle Store amazon" available Sep. 23, 2021, [online], [site visited Mar. 15, 2023]. Retrieved from Internet, URL:https://www.amazon.com/VVhistle-GPS-Health-Fitness-Rechargeable/dp/B09H14JQK7/ref=asc_df B09H14C2K7/ (2021).
"Whistle Health & GPS" available 2022, [online], [site visited Mar. 15, 2023]. Retrieved from Internet, URL:https://www.whistle.com/products/whistle-health-gps-plus-dog-tracker-activity-monitor?variant=39481877069872 (2022).

\* cited by examiner

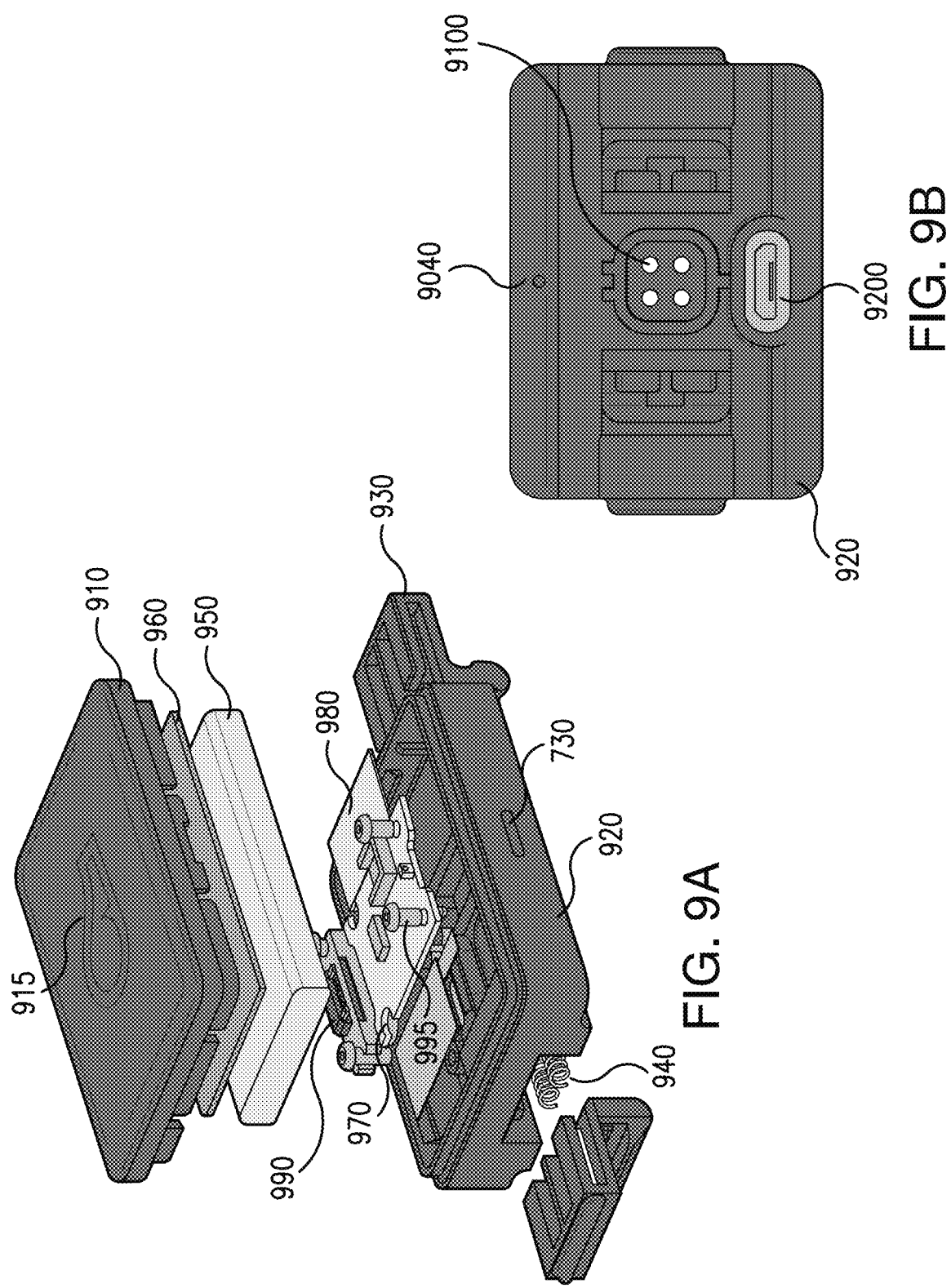

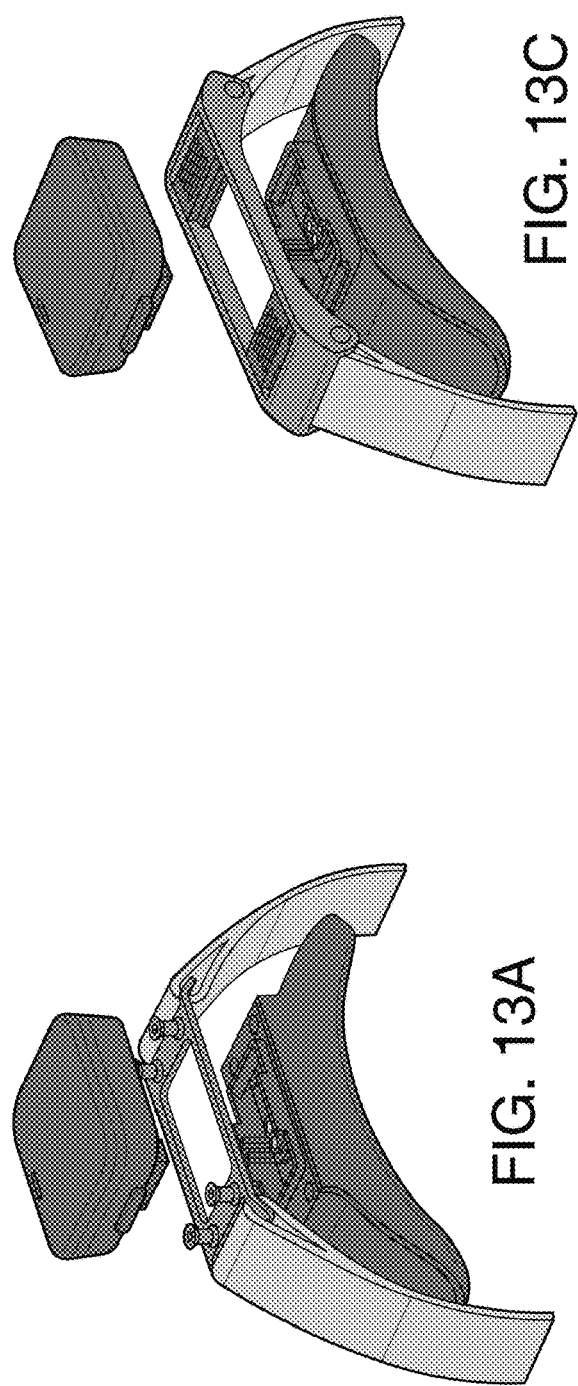
FIG. 13A
FIG. 13C
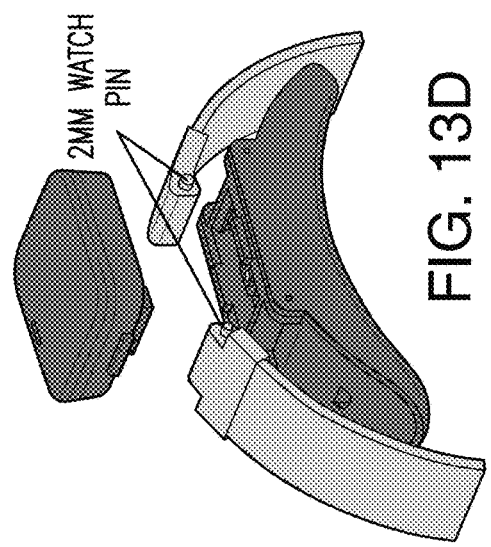
FIG. 13D
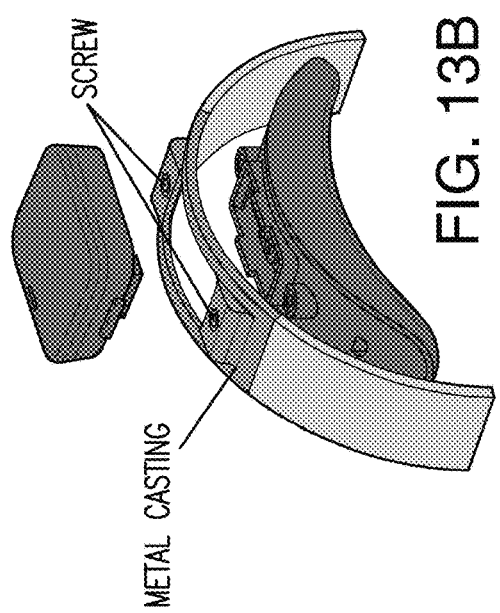
FIG. 13B

SYSTEM, METHOD, AND APPARATUS FOR TRACKING AND MONITORING PET ACTIVITY

CROSS-REFERENCE TO RELATED APPLICATION

This application claims priority to U.S. Provisional Patent Application Ser. No. 63/113,670, filed on Nov. 13, 2020, which is herein incorporated by reference in its entirety.

TECHNICAL FIELD

This disclosure generally relates to pet tracking devices for collecting and analyzing data related to pet activity or other data.

BACKGROUND

Mobile devices and/or wearable devices have been fitted with various hardware and software components that can help track human location. For example, mobile devices can communicate with a global positioning system (GPS) to help determine their location. More recently, mobile devices and/or wearable devices have moved beyond mere location tracking and can now include sensors that help to monitor human activity. The data resulting from the tracked location and/or monitored activity can be collected, analyzed and displayed. For example, a mobile device and/or wearable devices can be used to track the number of steps taken by a human for a preset period of time. The number of steps can then be displayed on a user graphic interface of the mobile device or wearable device.

The ever-growing emphasis on pet safety and health has resulted in an increased need to monitor pet behavior. Accordingly, there is an ongoing demand in the pet product industry for a system and/or method for tracking and monitoring pet activity. Yet, with human wearable devices, there are often convenient and regular downtime periods (e.g., when an individual is sleeping, showering, or idle) when the battery device can be charged. There remains a need for a wearable pet device that can accurately monitor pet activity, while allowing for minimal, convenient downtime for maintenance and battery charging.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 9A and 9B illustrate expanded and back views of a removable battery component according to certain non-limiting embodiments.

FIGS. 13A-13D illustrate various examples of attaching a tracking device to a strap plate according to certain non-limiting embodiments.

DESCRIPTION OF EXAMPLE EMBODIMENTS

Figure 1:
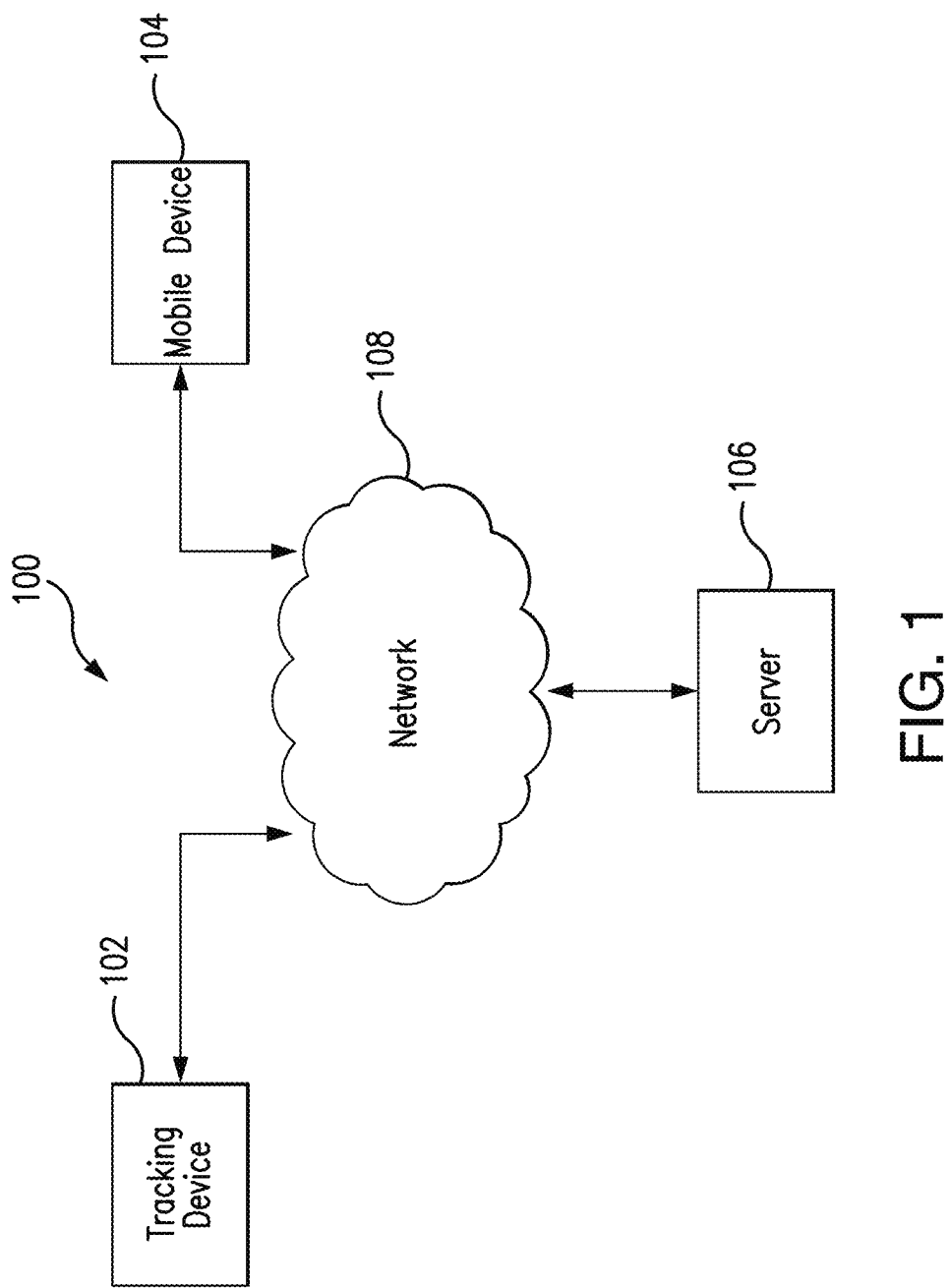
FIG. 1 illustrates a system diagram used to track and monitor a pet according to certain non-limiting embodiments.

There remains a need for a system, method, and device that can monitor and track pet activity, while allowing the user to conveniently charge the tracking device. The wearable device can comprise several components, a band comprising a strap plate, a removable battery components, and a tracking components, wherein the removable battery component can be configured to be removably attached to the tracking components, wherein the wearable device can by removably attached to the pet via the band, and wherein the tracking component can be removably attached to the strap plate. This allows the user to utilize one or multiple removable battery components to extend operability of the wearable device. The presently disclosed subject matter addresses this need, as well as other improvements associated with tracking and monitoring the health and wellness of pets. Specifically, a wearable device provides systems and methods to collect data related to the tracked or monitored activity of a pet and used to detect any potential health risks related to the pet.

A wearable device can include a removable battery component, a tracking component, and a band comprising a strap plate. The tracking component can be removably attached to the strap plate, and the removable battery component can be removably attached to the tracking component. The wearable device provides for tracking the location and monitoring the health and wellness of a pet. The components of the wearable device can be attached together such that each of the components are interchangeable and replaceable. Components of the wearable device can further provide functionality for tracking the location and determining health indicators of a pet or performing a wellness assessment of the pet. The wearable device can further include a power-save mode to reduce the power consumption of the wearable device and extend battery life. The battery can be included in the removable battery component of the wearable device. The wearable device can further include one or more contact units, wherein the tracking device comprises one or more receiving contact units, and wherein the one or more contact units are configured to contact the one or more receiving contact units.

The removable battery component can further comprise a top battery cover; a bottom battery cover; a battery component status indicator; and a battery, wherein the battery component status indicator is positioned on the bottom cover of the removable battery component, and wherein the battery component status indicator is positioned on a side surface of the bottom cover. The tracking component can further comprise a top tracking component cover, a bottom tracking component cover, and a tracking component status indicator.

PCT Application No. PCT/US2020/039909, U.S. patent application Ser. No. 15/291,882, now U.S. Pat. No. 10,142,773 B2, U.S. patent application Ser. No. 15/287,544, now U.S. Pat. No. 10,820,151, U.S. patent application Ser. No. 14/231,615, now U.S. Pat. No. 10,420,401, U.S. patent application Ser. No. 17/294,156, U.S. Provisional Application Nos. 62/867,226, 62/768,414, and 62/970,575, U.S. Design Application Nos. 29/696,311 and 29/696,315 are hereby incorporated by reference. The entire subject matter disclosed in the above referenced applications, including the specification, claims, and figures are incorporated herein.

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise.

As used herein, the terms "comprises," "comprising," or any other variation thereof, are intended to cover a non-exclusive inclusion, such that a process, method, article, system, or apparatus that comprises a list of elements does not include only those elements but can include other elements not expressly listed or inherent to such process, method, article, or apparatus.

In the detailed description herein, references to "embodiment," "an embodiment," "one embodiment," "in various embodiments," "certain embodiments," "some embodiments," "other embodiments," "certain other embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context. For example, terms, such as "and", "or", or "and/or," as used herein can include a variety of meanings that can depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

The term "animal" or "pet" as used in accordance with the present disclosure can refer to domestic animals including, domestic dogs, domestic cats, horses, cows, ferrets, rabbits, pigs, rats, mice, gerbils, hamsters, goats, and the like. Domestic dogs and cats are particular non-limiting examples of pets. The term "animal" or "pet" as used in accordance with the present disclosure can also refer to wild animals, including, but not limited to bison, elk, deer, venison, duck, fowl, fish, and the like.

The term "pet product" can include, for example and without limitation, any type of product, service, or equipment that is designed, manufactured, and/or intended for use by a pet. For example, the pet product can be a toy, a chewable, a food, an item of clothing, a collar, a medication, a health tracking device, a location tracking device, and/or any combination thereof. In another example a pet product can include a genetic or DNA testing service for pets.

The term "pet owner" can include any person, organization, and/or collection of persons that owns and/or is responsible for any aspect of the care of a pet.

The term "client device" can, for example and without limitation, refer to a computing system or mobile device used by a user of a given mobile application. In particular, the computing system can comprise functionality for determining its location, direction, or orientation, such as a GPS receiver, compass, gyroscope, or accelerometer. Client device can also include functionality for wireless communication, such as BLUETOOTH communication, near-field communication (NFC), or infrared (IR) communication or communication with wireless local area networks (WLANs) or cellular-telephone network. Such a device can also include one or more cameras, scanners, touchscreens, microphones, or speakers. Client devices can also execute software applications, such as games, web browsers, or social-networking applications. Client devices, for example, can include user equipment, smartphones, tablet computers, laptop computers, desktop computers, or smartwatches. In certain non-limiting embodiments, mobile devices can include one or more interfaces for communication between system 100 and one or more I/O devices. System 100 can further include one or more of these I/O devices, where appropriate. One or more of these I/O devices can enable communication between a person and system 100. As an example and not by way of limitation, an I/O device can include a keyboard, keypad, microphone, monitor, mouse, printer, scanner, speaker, still camera, stylus, tablet, touch screen, trackball, video camera, another suitable I/O device or a combination of two or more of these. An I/O device can include one or more sensors. This disclosure contemplates any suitable I/O devices and any suitable I/O interfaces for them. Where appropriate, I/O interface can include one or more device or software drivers enabling processor 202 to drive one or more of these I/O devices. I/O interface can include one or more I/O interfaces, where appropriate. Although this disclosure describes and illustrates a particular I/O interface, this disclosure contemplates any suitable I/O interface.

In certain non-limiting embodiments, a wearable device can include one or more sensors. The term "sensor" can refer to any hardware or software used to detect a variation of a physical quantity caused by activity or movement of the pet, such as an actuator, a gyroscope, a magnetometer, microphone, pressure sensor, or any other device that can be used to detect an object's displacement. In one non-limiting example, the sensor can be a three-axis accelerometer. The one or more sensors or actuators can be included in a microelectromechanical system (MEMS). A MEMS, also referred to as a MEMS device, can include one or more miniaturized mechanical and/or electro-mechanical elements that function as sensors and/or actuators and can help to detect positional variations, movement, and/or acceleration. In other embodiments any other sensor or actuator can be used to detect any physical characteristic, variation, or quantity. The wearable device, also referred to as a collar device, can also include one or more transducers. The transducer can be used to transform the physical characteristic, variation, or quantity detected by the sensor and/or actuator into an electrical signal, which can be transmitted from the one or more wearable device through a network to a server.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

This disclosure contemplates any suitable number of systems 100. This disclosure contemplates computer system 100 taking any suitable physical form. As example and not by way of limitation, computer system 100 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 100 can include one or more computer systems 100; be unitary or distributed; span multiple locations; span multiple machines; span multiple data centers; or reside in a cloud, which can include one or more cloud components in one or more networks. Where appropriate, one or more computer systems 100 can perform without substantial spatial or temporal limitation one or more steps of one or more methods described or illustrated herein. As an example and not by way of limitation, one or more computer systems 100 can perform in real time or in batch mode one or more steps of one or more methods described or illustrated herein. One or more computer systems 100 can perform at different times or at different locations one or more steps of one or more methods described or illustrated herein, where appropriate.

FIG. 1 illustrates a system diagram used to track and monitor a pet according to certain non-limiting embodiments. In particular, as illustrated in FIG. 1, the system 100 can include a tracking device 102, a mobile device 104, a server 106, and/or a network 108. Tracking device 102 can be a wearable device as shown in FIGS. 6-13. The wearable device can be placed on a collar of the pet, and can be used to track, monitor, and/or detect the activity of the pet using one or more sensors. In other non-limiting embodiments, tracking device 102 can comprise a computing device designed to be worn, or otherwise carried, by a pet or animal in any other location other than the collar. Although this disclosure describes and illustrates a system having a certain number of components in an arrangement, this disclosure contemplates any suitable system having any suitable number of components in any arrangement.

Figure 2:
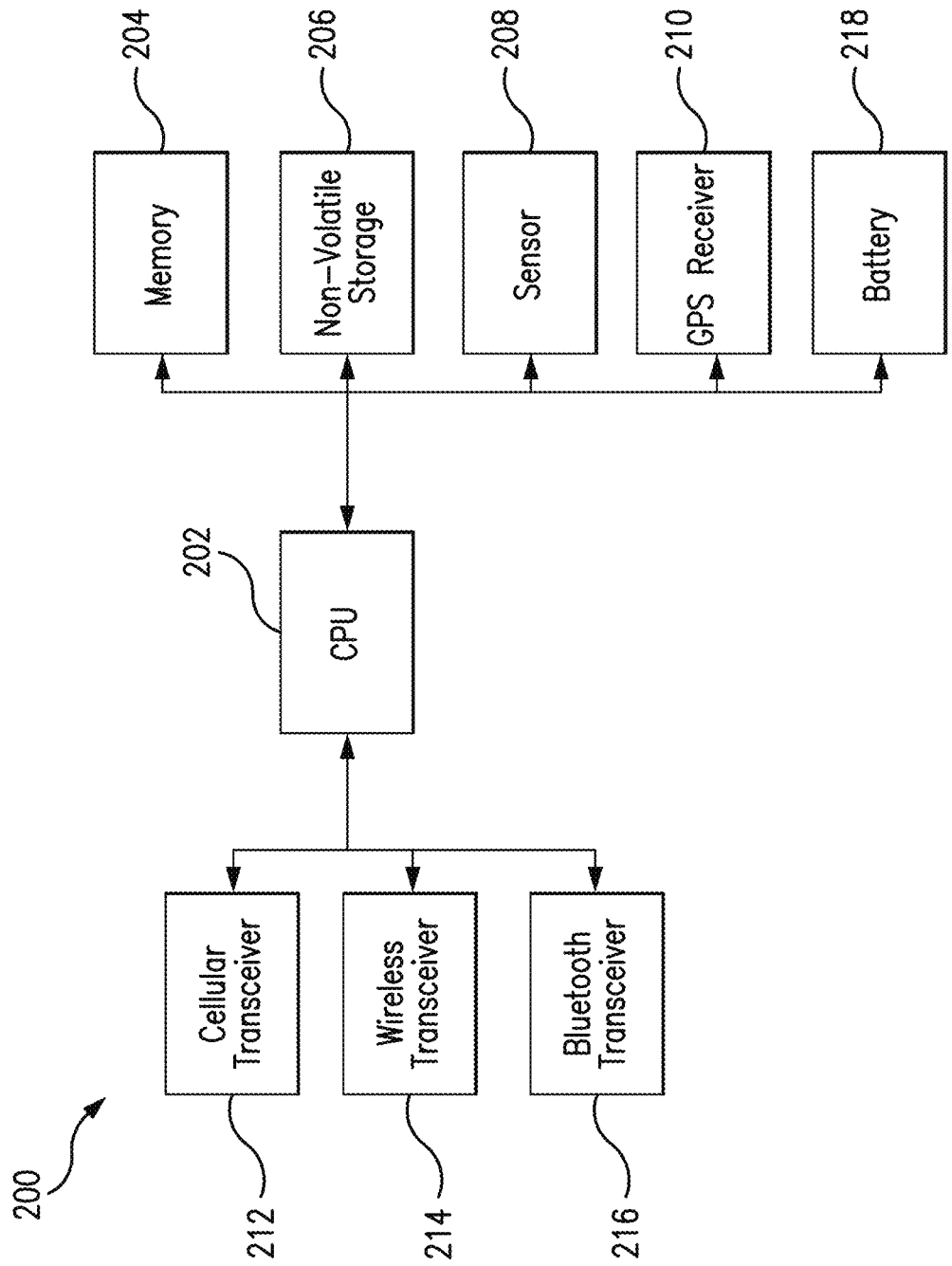
FIG. 2 illustrates a device that can be used to track and monitor a pet according to certain non-limiting embodiments.

In one non-limiting embodiment, tracking device 102 can include the hardware illustrated in FIG. 2. The tracking device 102 can be configured to collect data generated by various hardware or software components, generally referred to as sensors, present within the tracking device 102. For example, a GPS receiver or one or more sensors, such as accelerometer, gyroscope, or any other device or component used to record, collect, or receive data regarding the movement or activity of the tracking device 102. The activity of tracking device 102, in some non-limiting embodiments, can mimic the movement of the pet on which the tracking device is located. While tracking device 102 can be attached to the collar of the pet, as described in U.S. patent application Ser. No. 14/231,615, hereby incorporated by reference in its entirety, in other embodiments tracking device 102 can be attached to any other item worn by the pet. In some non-limiting embodiments, tracking device 102 can be located on or inside the pet itself, such as, for example, a microchip implanted within the pet.

As discussed in more detail herein, tracking device 102 can further include a processor capable of processing the one or more data collected from tracking device 102. The processor can be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors can be implemented as a single controller, or a plurality of controllers or processors. In certain non-limiting embodiments, processor 202 includes hardware for executing instructions, such as those making up a computer program. As an example and not by way of limitation, to execute instructions, processor 202 can retrieve (or fetch) the instructions from an internal register, an internal cache, memory 204, or storage 206; decode and execute them; and then write one or more results to an internal register, an internal cache, memory 204, or storage 206. In certain non-limiting embodiments, processor 202 can include one or more internal caches for data, instructions, or addresses. This disclosure contemplates processor 202 including any suitable number of any suitable internal caches, where appropriate. As an example and not by way of limitation, processor 202 can include one or more instruction caches, one or more data caches, and one or more translation lookaside buffers (TLBs). Instructions in the instruction caches can be copies of instructions in memory 204 or storage 206, and the instruction caches can speed up retrieval of those instructions by processor 202. Data in the data caches can be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches can speed up read or write operations by processor 202. The TLBs can speed up virtual-address translation for processor 202. In certain non-limiting embodiments, processor 202 can include one or more internal registers for data, instructions, or addresses. This disclosure contemplates processor 202 including any suitable number of any suitable internal registers, where appropriate. Where appropriate, processor 202 can include one or more arithmetic logic units (ALUs); be a multi-core processor; or include one or more processors 202. Although this disclosure describes and illustrates a particular processor, this disclosure contemplates any suitable processor.

In some non-limiting embodiments, the tracking device 102 can specifically be configured to collect, sense, or receive data, and/or pre-process data prior to transmittal. In addition to sensing, recording, and/or processing data, tracking device 102 can further be configured to transmit data, including location and any other data monitored or tracked, to other devices or severs via network 108. In certain non-limiting embodiments, tracking device 102 can transmit any data tracked or monitored data continuously to the network. In other non-limiting embodiments, tracking device 102 can discretely transmit any tracked or monitored data. Discrete transmittal can be transmitting data after a finite period of time. For example, tracking device 102 can transmit data once an hour. This can help to reduce the battery power consumed by tracking device 102, while also conserving network resources, such as bandwidth.

As shown in FIG. 1, tracking device 102 can communicate with network 108. Although illustrated as a single network, network 108 can comprise multiple or a plurality of networks facilitating communication between devices. This disclosure contemplates any suitable network and any suitable communication interface for it. Network 108 can be a radio-based communication network that uses any available radio access technology. Available radio access technologies can include, for example, Bluetooth, wireless local area network ("WLAN"), Global System for Mobile Communications (GMS), Universal Mobile Telecommunications System (UMTS), any Third Generation Partnership Project ("3GPP") Technology, including Long Term Evolution ("LTE"), LTE-Advanced, Third Generation technology ("3G"), or Fifth Generation ("5G")/New Radio ("NR") technology. Network 108 can use any of the above radio access technologies, or any other available radio access technology, to communicate with tracking device 102, server 106, and/or mobile device 104. Tracking device 102 can include any suitable communication interface for any of these networks, where appropriate. Communication interface can include one or more communication interfaces, where appropriate. Although this disclosure describes and illustrates a particular communication interface, this disclosure contemplates any suitable communication interface.

In one non-limiting embodiment, the network 108 can include a WLAN, such as a wireless fidelity ("Wi-Fi") network defined by the IEEE 802.11 standards or equivalent standards. In this embodiment, network 108 can allow the transfer of location and/or any tracked or monitored data from tracking device 102 to server 106. Additionally, the network 108 can facilitate the transfer of data between tracking device 102 and mobile device 104. In an alternative embodiment, the network 108 can comprise a mobile network such as a cellular network. In this embodiment, data can be transferred between the illustrated devices in a manner similar to the embodiment wherein the network 108 is a WLAN. In certain non-limiting embodiments tracking device 102, also referred to as wearable device, can reduce network bandwidth and extend battery life by transmitting when data to server 106 only or mostly when it is connected to the WLAN network.

In certain non-limiting embodiments, the tracking device can enter a power-save mode upon certain criteria being triggered. The power-saving mode can help to extend the battery life of tracking device 102. The criteria for entering power-saving mode can comprise, for example, when the tracking device is not connected to a WLAN, when a predetermined period of inactivity occurs, or after a given period of time in which the pet remains idle. After entering power-saving mode, the operating system can continue to monitor or track data, but not transmit any of the collected data to server 106. In some other non-limiting examples, in power-saving mode wearable device 102 can restrict or delay the completion of various work items (e.g., sending information to server 106, or outputting alerts or notifications). In some non-limiting embodiments a scheduler associated with the operating system can determine how the work items should be processed (e.g., whether the work item prohibits the CPU from entering power-save mode). The power saving mode can be activated manually by a user or automatically by the mobile device.

In certain non-limiting embodiments, a user can select, using a graphical user interface (GUI) of the mobile device, an interval or time period in which the tracking device should check-in over a wireless connection. When checking-in, the tracking device can inquire whether the internal or time period can be a valid time for the tracking device to upload accelerometer data to the mobile device. For example, the interval or time period for the wireless check-in can be 3 minutes, 6 minutes, 10 minutes, 30 minutes, or any other time period. Once the interval or time period is selected by the user, the tracking device can be updated to check-in on the selected interval or time period. The longer the selected interval or time period, the less battery power can be consumed. For example, a check-in interval of 3 minutes will consume more battery power than a 30-minute interval.

During power-saving mode, also referred to as a sleep mode, one or more cores of the CPU in the wearable device can remain in the power-saving mode until a wake-up signal is received. This results in efficient power usage and extended battery life. In some non-limiting embodiments, one or more cores of the CPU can persistently monitor the network for a condition or work item request that would trigger the wearable device to exit power-saving mode. In some non-limiting embodiments, the wearable device can be passively listening to one or more given frequencies (e.g., cellular frequency), even during power-saving mode. In such embodiments, the wearable device can exit the power-saving mode after receiving a push communication from a server or mobile device to the wearable device. The push communication can be transmitted through a cellular network, and/or can be activated via an application on a mobile device. The push communication can be used to remotely update one or more settings on the tracking device, such as activation of the GPS receiver, or activation of an auditory or visual alert.

In one non-limiting embodiment, tracking device 102 and mobile device 104 can transfer data directly between the devices. Such direct transfer can be referred to as device-to-device communication or mobile-to-mobile communication. While described in isolation, network 108 can include multiple networks. For example, network 108 can include a Bluetooth network that can help to facilitate transfers of data between tracking device 102 and mobile device 104, a wireless land area network, and a mobile network.

The system 100 can further include a mobile device 104. Mobile device 104 can be any available user equipment or mobile station, such as a mobile phone, a smart phone or multimedia device, or a tablet device. In alternative embodiments, mobile device 104 can be a computer, such as a laptop computer, provided with wireless communication capabilities, personal data or digital assistant (PDA) provided with wireless communication capabilities, portable media player, digital camera, pocket video camera, navigation unit provided with wireless communication capabilities or any combinations thereof. As discussed previously, mobile device 104 can communicate with a tracking device 102. In these embodiments, mobile device 104 can receive location, data related to a pet, wellness assessment, and/or health recommendation from a tracking device 102, server 106, and/or network 108. Additionally, tracking device 102 can receive data from mobile device 104, server 106, and/or network 108. In one non-limiting embodiment, tracking device 102 can receive data regarding the proximity of mobile device 104 to tracking device 102 or an identification of a user associated with mobile device 104. A user associated with mobile device 104, for example, can be an owner of the pet.

Mobile device 104 (or non-mobile device) can additionally communicate with server 106 to receive data from server 106. For example, server 106 can include one or more application servers providing a networked application or application programming interface (API). In one non-limiting embodiment, mobile device 104 can be equipped with one or more mobile or web-based applications that communicates with server 106 via an API to retrieve and present data within the application. In one non-limiting embodiment, server 106 can provide visualizations or displays of location or data received from tracking device 102. For example, visualization data can include graphs, charts, or other representations of data received from tracking device 102.

FIG. 2 illustrates a device that can be used to track and monitor a pet according to certain non-limiting embodiments. The device 200 can be, for example, tracking device 102, server 106, or mobile device 104. Device 200 includes a CPU 202, memory 204, non-volatile storage 206, sensor 208, GPS receiver 210, cellular transceiver 212, Bluetooth transceiver 216, wireless transceiver 214, such as a WiFi or WLAN transceiver, and battery 218. The device can include any other hardware, software, processor, memory, transceiver, and/or graphical user interface.

As discussed with respect to FIG. 2, the device 200 can a wearable device designed to be worn by, or otherwise connected to, a pet. The device 200 includes one or more sensors 208, such as a three axis accelerometer. The one or more sensors can be used in combination with GPS receiver 210, for example. GPS receiver 210 can be used along with sensor 208 which monitor the device 200 to identify its position (via GPS receiver 210) and its acceleration, for example, (via sensor 208). Although illustrated as single components, sensor 208 and GPS receiver 210 can alternatively each include multiple components providing similar functionality. In certain non-limiting embodiment, GPS receiver 210 can instead be a Global Navigation Satellite System (GLONASS) receiver.

Sensor 208 and GPS receiver 210 generate data as described in more detail herein and transmits the data to other components via CPU 202. Alternatively, or in conjunction with the foregoing, sensor 208 and GPS receiver 210 can transmit data to memory 204 for short-term storage. In one non-limiting embodiment, memory 204 can comprise a random access memory device or similar volatile storage device. In certain non-limiting embodiments, memory 204 includes main memory for storing instructions for processor 202 to execute or data for processor 202 to operate on. As an example and not by way of limitation, computer system 100 can load instructions from storage 206 or another source (such as, for example, another system 100) to memory 204. Processor 202 can then load the instructions from memory 204 to an internal register or internal cache. To execute the instructions, processor 202 can retrieve the instructions from the internal register or internal cache and decode them. During or after execution of the instructions, processor 202 can write one or more results (which can be intermediate or final results) to the internal register or internal cache. Processor 202 can then write one or more of those results to memory 204. In certain non-limiting embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which can each include an address bus and a data bus) can couple processor 202 to memory 204. In certain non-limiting embodiments, one or more memory management units (MMUs) reside between processor 202 and memory 204 and facilitate accesses to memory 204 requested by processor 202. In certain non-limiting embodiments, memory 204 includes random access memory (RAM). This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 204 can include one or more non-transitory (and/or non-volatile) memories 204, where appropriate. Although this disclosure describes and illustrates a particular memory component, this disclosure contemplates any suitable memory.

Alternatively, or in conjunction with the foregoing, sensor 208 and GPS receiver 210 can transmit data directly to non-volatile storage 206. In this embodiment, CPU 202 can access the data (e.g., location and/or event data) from memory 204. In some non-limiting embodiments, non-volatile storage 206 can comprise a solid-state storage device (e.g., a "flash" storage device) or a traditional storage device (e.g., a hard disk). In certain non-limiting embodiments, storage 206 includes mass storage for data or instructions. As an example and not by way of limitation, storage 206 can include a hard disk drive (HDD), a floppy disk drive, flash memory, an optical disc, a magneto-optical disc, magnetic tape, or a Universal Serial Bus (USB) drive or a combination of two or more of these. Storage 206 can include removable or non-removable (or fixed) media, where appropriate. Storage 206 can be internal or external to computer system 100, where appropriate. In certain non-limiting embodiments, storage 206 is non-volatile, solid-state memory. In certain non-limiting embodiments, storage 206 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 can include one or more storage control units facilitating communication between processor 202 and storage 206, where appropriate. Where appropriate, storage 206 can include one or more storages 206. Although this disclosure describes and illustrates particular storage, this disclosure contemplates any suitable storage.

Specifically, GPS receiver 210 can transmit location data (e.g., latitude, longitude, etc.) to CPU 202, memory 204, or non-volatile storage 206 in similar manners. In some non-limiting embodiments, CPU 202 can comprise a field programmable gate array or customized application-specific integrated circuit.

As illustrated in FIG. 2, the device 200 includes multiple network interfaces including cellular transceiver 212, wireless transceiver 214, and Bluetooth transceiver 216. Cellular transceiver 212 allows the device 200 to transmit the data, processed by CPU 202, to a server via any radio access network. Additionally, CPU 202 can determine the format and contents of data transferred using cellular transceiver 212, wireless transceiver 214, and Bluetooth transceiver 216 based upon detected network conditions. Transceivers 212, 214, 216 can each, independently, be a transmitter, a receiver, or both a transmitter and a receiver, or a unit or device that can be configured both for transmission and reception. The transmitter and/or receiver (as far as radio parts are concerned) can also be implemented as a remote radio head which is not located in the device itself, but in a mast, for example.

Figure 3:
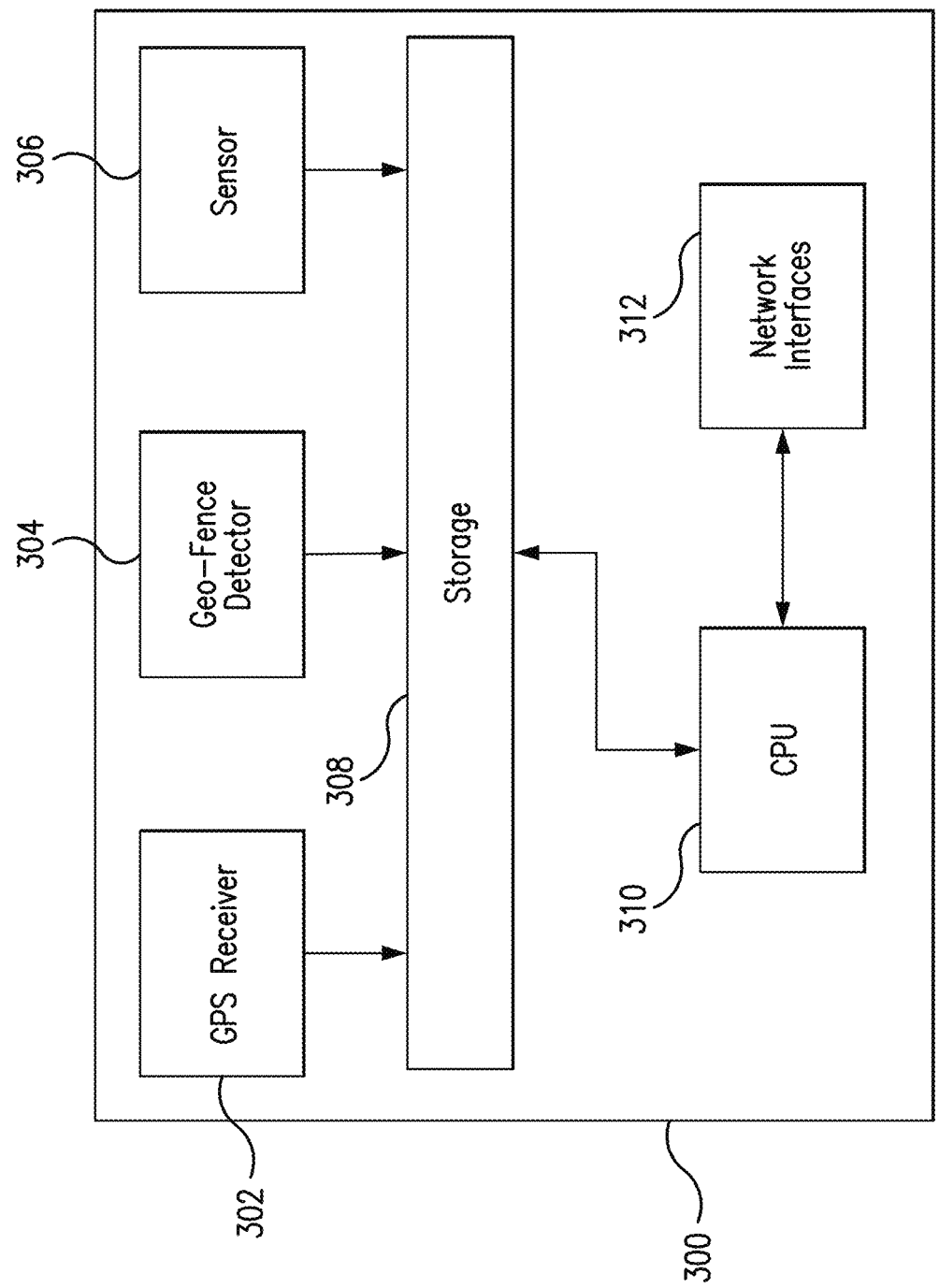
FIG. 3 illustrates a logical block diagram of a device that can be used to track and monitor a pet according to certain non-limiting embodiments.

FIG. 3 is a logical block diagram illustrating a device that can be used to track and monitor a pet according to certain non-limiting embodiments. As illustrated in FIG. 3, a device 300, such as tracking device 102 shown in FIG. 1, also referred to as a wearable device, or mobile device 104 shown in FIG. 1, which can include a GPS receiver 302, a geo-fence detector 304, a sensor 306, storage 308, CPU 310, and network interfaces 312. Geo-fence can refer a geolocation-fence as described below. GPS receiver 302, sensor 306, storage 308, and CPU 310 can be similar to GPS receiver 210, sensor 208, memory 204/non-volatile storage 206, or CPU 202, respectively. Network interfaces 312 can correspond to one or more of transceivers 212, 214, 216. Device 300 can also include one or more power sources, such as a battery. Device 300 can also include a charging port, which can be used to charge the battery. The charging port can be, for example, a type-A universal serial bus ("USB") port, a type-B USB port, a mini-USB port, a micro-USB port, or any other type of port. In some other non-limiting embodiments, the battery of device 300 can be wirelessly charged.

In the illustrated embodiment, GPS receiver 302 records location data associated with the device 300 including numerous data points representing the location of the device 300 as a function of time.

In one non-limiting embodiment, geo-fence detector 304 stores details regarding known geo-fence zones. For example, geo-fence detector 304 can store a plurality of latitude and longitude points for a plurality of polygonal geo-fences. The latitude and/or longitude points or coordinates can be manually inputted by the user and/or automatically detected by the wearable device. In alternative embodiments, geo-fence detector 304 can store the names of known WLAN network service set identifier (SSIDs) and associate each of the SSIDs with a geo-fence, as discussed in more detail with respect to FIG. 4. In non-limiting one non-limiting embodiment, geo-fence detector 304 can store, in addition to an SSID, one or more thresholds for determining when the device 300 exits a geo-fence zone. Although illustrated as a separate component, in some non-limiting embodiments, geo-fence detector 304 can be implemented within CPU 310, for example, as a software module.

In one non-limiting embodiment, GPS receiver 302 can transmit latitude and longitude data to geo-fence detector 304 via storage 308 or, alternatively, indirectly to storage 308 via CPU 310. A geo-fence can be a virtual fence or safe space defined for a given pet. The geo-fence can be defined based on a latitude and/or longitudinal coordinates and/or by the boundaries of a given WLAN connection signal. For example, geo-fence detector 304 receives the latitude and longitude data representing the current location of the device 300 and determines whether the device 300 is within or has exited a geo-fence zone. If geo-fence detector 304 determines that the device 300 has exited a geo-fence zone the geo-fence detector 304 can transmit the notification to CPU 310 for further processing. After the notification has been processed by CPU 310, the notification can be transmitted to the mobile device either directly or via the server.

Alternatively, geo-fence detector 304 can query network interfaces 312 to determine whether the device is connected to a WLAN network. In this embodiment, geo-fence detector 304 can compare the current WLAN SSID (or lack thereof) to a list of known SSIDs. The list of known SSIDs can be based on those WLAN connections that have been previously approved by the user. The user, for example, can be asked to approve an SSID during the set up process for a given wearable device. In another example, the list of known SSIDs can be automatically populated based on those WLAN connections already known to the mobile device of the user. If geo-fence detector 304 does not detect that the device 300 is currently connected to a known SSID, geofence detector 304 can transmit a notification to CPU 310 that the device has exited a geo-fence zone. Alternatively, geo-fence detector 304 can receive the strength of a WLAN network and determine whether the current strength of a WLAN connection is within a predetermined threshold. If the WLAN connection is outside the predetermined threshold, the wearable device can be nearing the outer border of the geo-fence. Receiving a notification once a network strength threshold is surpassed can allow a user to receiver a preemptive warning that the pet is about to exit the geo-fence.

As illustrated in FIG. 3, device 300 further includes storage 308. In one non-limiting embodiment, storage 308 can store past or previous data sensed or received by device 300. For example, storage 308 can store past location data. In other non-limiting embodiments, instead of storing previously sensed and/or received data, device 300 can transmit the data to a server, such as server 106 shown in FIG. 1. The previous data can then be used to determine a health indicator which can be stored at the server. The server can then compare the health indicators it has determined based on the recent data it receives to the stored health indicators, which can be based on previously stored data. Alternatively, in certain non-limiting embodiments device 300 can use its own computer capabilities or hardware to determine a health indicator. Tracking changes of the health indicator or metric using device 308 can help to limit or avoid the transmission of data to the server. The wellness assessment and/or health recommendation made by server 106 can be based on the previously stored data. The wellness assessment, for example, can include dermatological diagnoses, such as a flare up, ear infection, arthritis diagnoses, cardiac episode, pancreatic episode, kidney disease, eating disorders, and/or thyroid issues.

In one non-limiting example, the stored data can include data describing a walk environment details, which can include the time of day, the location of the tracking device, movement data associated with the device (e.g., velocity, acceleration, etc.) for previous time the tracking device exited a geo-fence zone. The time of day can be determined via a timestamp received from the GPS receiver or via an internal timer of the tracking device.

CPU 310 is capable of controlling access to storage 308, retrieving data from storage 308, and transmitting data to a networked device via network interfaces 312. As discussed more fully with respect to FIG. 4, CPU 310 can receive indications of geo-fence zone exits from geo-fence detector 304 and can communicate with a mobile device using network interfaces 312. In one non-limiting embodiment, CPU 310 can receive location data from GPS receiver 302 and can store the location data in storage 308. In one non-limiting embodiment, storing location data can comprise associated a timestamp with the data. In some non-limiting embodiments, CPU 310 can retrieve location data from GPS receiver 302 according to a pre-defined interval. For example, the pre-defined interval can be once every three minutes. In some non-limiting embodiments, this interval can be dynamically changed based on the estimated length of a walk or the remaining battery life of the device 300. CPU 310 can further be capable of transmitting location data to a remove device or location via network interfaces 312.

Figure 4:
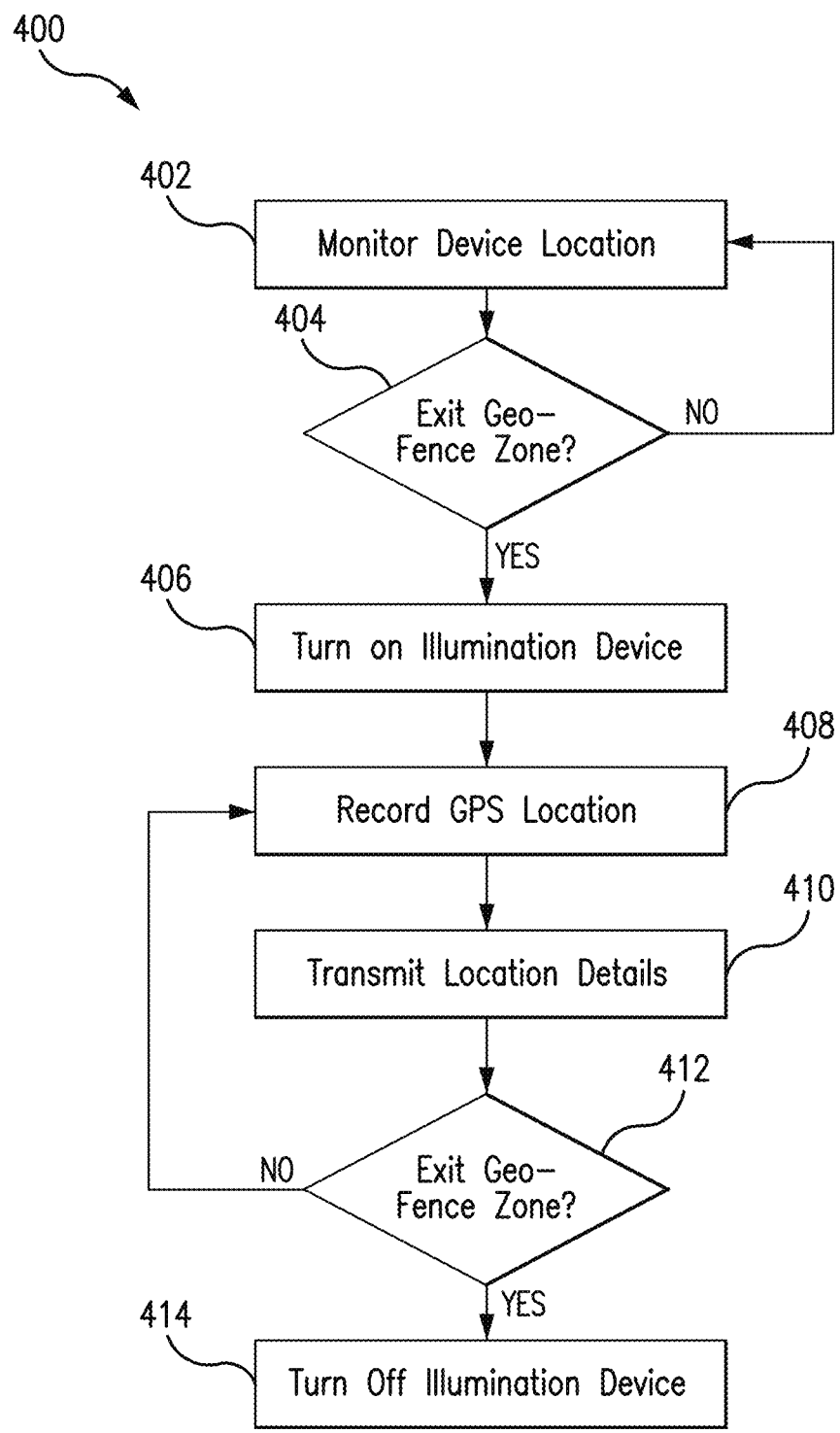
FIG. 4 illustrates a flow diagram of a method for tracking a pet according to certain non-limiting embodiments.

FIG. 4 is a flow diagram illustrating a method for tracking a pet according to certain non-limiting embodiments. In step 402, method 400 can be used to monitors the location of a device. In one non-limiting embodiment, monitoring the location of a device can comprise monitoring the GPS position of the device discretely, meaning at regular intervals. For example, in step 402, the wearable device can discretely poll a GPS receiver every five seconds and retrieve a latitude and longitude of a device. Alternatively, in some other non-limiting embodiments, continuous polling of a GPS location can be used. By discretely polling the GPS receiver, as opposed to continuously polling the device, the method can extend the battery life of the mobile device, and reduce the number of network or device resources consumed by the mobile device.

In other non-limiting embodiments, method 400 can utilize other methods for estimating the position of the device, without relying on the GPS position of the device. For example, method 400 can monitor the location of a device by determining whether the device is connected to a known WLAN connection and using the connection to a WLAN as an estimate of the device location. In yet another non-limiting embodiment, a wearable device can be paired to a mobile device via a Bluetooth network. In this embodiment, method 400 can query the paired device to determine its location using, for example, the GPS coordinates of the mobile device.

In step 404, method 400 can include determining whether the device has exited a geo-fence zone. As discussed above, in one non-limiting embodiment, method 400 can include continuously polling a GPS receiver to determine the latitude and longitude of a device. In this embodiment, method 400 can then compare the received latitude and longitude to a known geo-fence zone, wherein the geofenced region includes a set of latitude and longitude points defining a region, such as a polygonal region. When using a WLAN to indicate a location, method 400 can determine that a device exits geo-fence zone when the presence of a known WLAN is not detected. For example, a tracking device can be configured to identify a home network (e.g., using the SSID of the network). When the device is present within the home (e.g., when a pet is present within the home), method 400 can determine that the device has not exited the geo-fence zone. However, as the device moves out of range of the known WLAN, method 400 can determine that a pet has left or exited the geo-fence zone, thus implicitly constructing a geo-fence zone based on the contours of the WLAN signal.

Alternatively, or in conjunction with the foregoing, method 400 can employ a continuous detection method to determine whether a device exits a geo-fence zone. Specifically, WLAN networks generally degrade in signal strength the further a receiver is from the wireless access point or base station. In one non-limiting embodiment, the method 400 can receive the signal strength of a known WLAN from a wireless transceiver. In this embodiment, the method 400 can set one or more predefined thresholds to determine whether a device exits a geo-fence.

For example, a hypothetical WLAN can have signal strengths between ten and zero, respectively representing the strongest possible signal and no signal detected. In certain non-limiting embodiments, method 400 can monitor for a signal strength of zero before determining that a device has exited a geo-fence zone. Alternatively, or in conjunction with the foregoing, method 400 can set a threshold signal strength value of three as the border of a geo-fence region. In this example, the method 400 can determine a device exited a geo-fence when the signal strength of a network drops below a value of three. In some non-limiting embodiments, the method 400 can utilize a timer to allow for the possibility of the network signal strength returning above the predefined threshold. In this embodiment, the method 400 can allow for temporary disruptions in WLAN signal strength to avoid false positives and/or short term exits.

If in method 400 the server determines that a wearable device has not exited a geo-fence zone, method 400 can continue to monitor the device location in step 402, either discretely or continuously. Alternatively, if method 400 determines that a device has exited a geo-fence zone, a sensor can send a signal instructing the wearable device to turn on an illumination device, as shown in step 406. The illumination device, for example, can include a light emitting diode (LED) or any other light. The illumination device can be positioned within the housing of the wearable device, and can illuminate at least the top cover of the wearable device, also referred to as a wearable device. In yet another example, the illumination device can light up at least a part and/or a whole surface of the wearable device. In certain non-limiting embodiments, instead of an illumination device the wearable device can include any other indicator, such as a sound device, which can include a speaker, and/or a vibration device. In step 406, therefore, any of the above indicators, whether an illumination device, a sound device, or a vibration device can be turned on or activated.

In certain non-limiting embodiments, a mobile device user can be prompted to confirm whether the wearable device has exited the geo-fence zone. For example, a wearable device can be paired with a mobile device via a Bluetooth connection. In this embodiment, the method 400 can comprise alerting the device via the Bluetooth connection that the illumination device has been turned on, in step 406, and/or that the wearable device has exited the geo-fence zone, in step 404. The user can then confirm that the wearable device has existed the geo-fence zone (e.g., by providing an on-screen notification). Alternatively, a user can be notified by receiving a notification from a server based on the data received from the mobile device.

Alternatively, or in conjunction with the foregoing, method 400 can infer the start of a walk based on the time of day. For example, a user can schedule walks at certain times during the day (e.g., morning, afternoon, or night). As part of detecting whether a device exited a geo-fence zone, method 400 can further inspect a schedule of known walks to determine whether the timing of the geo-fence exiting occurred at an expected walk time (or within an acceptable deviation therefrom). If the timing indicates an expected walk time, a notification to the user that the wearable device has left the geo-fence zone can be bypassed.

Alternatively, or in conjunction with the foregoing, the method 400 can employ machine-learning techniques to infer the start of a walk without requiring the above input from a user. Machine learning techniques, such as feed forward networks, deep forward feed networks, deep convolutional networks, and/or long or short term memory networks can be used for any data received by the server and sensed by the wearable device. For example, during the first few instances of detecting a wearable device exiting the geo-fence zone, method 400 can continue to prompt the user to confirm that they are aware of the location of the wearable device. As method 400 receives either a confirmation or denial from the user, method 400 can train a learning machine located in the server to identify conditions associated with exiting the geo-fence zone. For example, after a few prompt confirmations, a server can determine that on weekdays between 7:00 AM and 7:30 AM, a tracking device repeatedly exits the geo-fence zone (i.e., conforming to a morning walk of a pet). Relatedly, server can learn that the same event (e.g., a morning walk) can occur later on weekends (e.g., between 8:00 AM and 8:30 AM). The server can therefore train itself to determine various times when the wearable device exits the geo-fence zone, and not react to such exits. For example, between 8:00 AM and 8:30 AM on the weekend, even if an exit is detected the server will not instruct the wearable device to turn on illumination device 406.

In certain non-limiting embodiments, the wearable device and/or server can continue to monitor the location and record the GPS location of the wearable device, as shown in step 408. In step 410, the wearable device can transmit location details to a server and/or to a mobile device.

In one non-limiting embodiment, the method 400 can continuously poll the GPS location of a wearable device. In some non-limiting embodiments, a poll interval of a GPS device can be adjusted based on the battery level of the device. For example, the poll interval can be reduced if the battery level of the wearable device is low. In one non-limiting example the poll interval can be reduced from every 3 minutes to every 15 minutes. In alternative embodiments, the poll interval can be adjusted based on the expected length of the wearable device's time outside the geo-fence zone. That is, if the time outside the geo-fence zone is expected to last for thirty minutes (e.g., while walking a dog), the server and/or wearable device can calculate, based on battery life, the optimal poll interval. As discussed above, the length of a walk can be inputted manually by a user or can be determined using a machine-learning or artificial intelligence algorithm based on previous walks.

In step 412, the server and/or the wearable device can determine whether the wearable device has entered the geo-fence zone. If not, steps 408, 410 can be repeated. The entry into the geo-fence zone can be a re-entry into the geo-fence zone. That is, it can be determined that the wearable device has entered the geo-fence zone, having previously exited the geo-fence zone. As discussed above, the server and/or wearable device can utilize a poll interval to determine how frequently to send data. In one non-limiting embodiment, the wearable device and/or the server can transmit location data using a cellular or other radio network. Methods for transmitting location data over cellular networks are described more fully in commonly owned U.S. Non-Provisional application Ser. No. 15/287,544, entitled "System and Method for Compressing High Fidelity Motion Data for Transmission Over a Limited Bandwidth Network," which is hereby incorporated by reference in its entirety.

Finally, if the server and/or wearable device determine that the wearable device has entered the geo-fence zone, the illumination device, or any other indicated located on the wearable device, can be turned off. In some non-limiting embodiments, not shown in FIG. 4, when a wearable device exits the geo-fence zone the user can choose to turn off the illumination device. For example, when a user of a mobile device confirms that the wearable device has exited the geo-fence zone, the user can instruct the server to instruct the wearable device, or instruct the wearable device directly, to turn off the illumination device.

Figure 5:
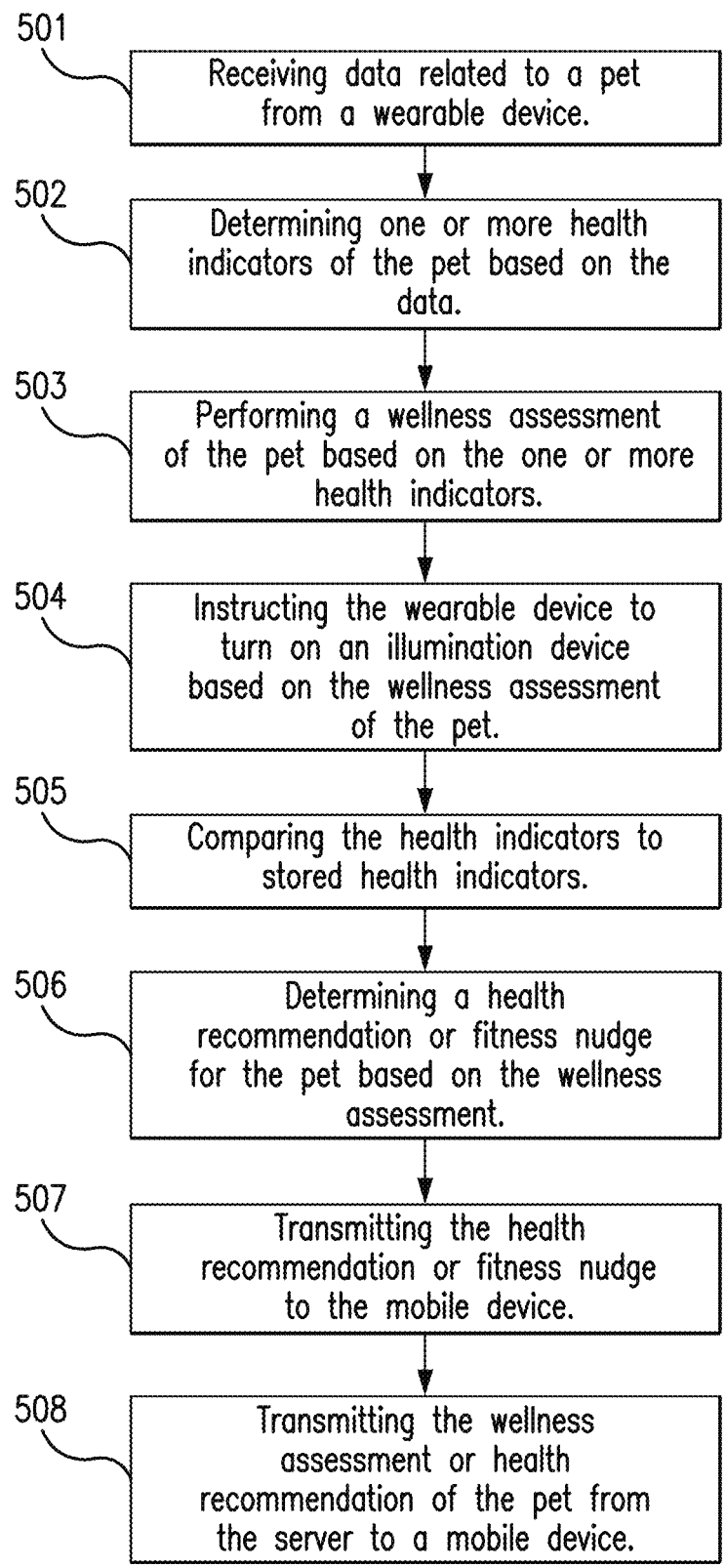
FIG. 5 illustrates a flow diagram of a method for tracking and monitoring the pet according to certain non-limiting embodiments.

FIG. 5 is a flow diagram illustrating a method for tracking and monitoring the pet according to certain non-limiting embodiments. The steps of the method shown in FIG. 5 can be performed by a server, the wearable device, and/or the mobile device. The wearable device can sense, detect, or collect data related to the pet from one or more sensors. The data can include, for example, data related to location or movement of the pet. In certain non-limiting examples, the wearable device can include one or more sensors, which can allow the wearable device to detected movement of the pet.

In some non-limiting embodiments, the sensor can be a collar mounted triaxial accelerometer, which can allow the wearable device to detect various body movements of the pet. The various body movement can include, for example, any bodily movement associated with itching, scratching, licking, walking, drinking, eating, sleeping, sleep disruptions, and shaking, and/or any other bodily movement associated with an action performed by the pet. In certain examples, the one or more sensors can detect a pet jumping around, excited for food, eating voraciously, drinking out of the bowl on the wall, pet movement during typical sleep times, and/or walking around the room. The one or more sensors can also detect activity of a pet after a medical procedure or veterinary visit, such as a castration or ovariohysterectomy visit. In some non-limiting embodiments the user can manually upload an event to assist in the tracking and monitoring of the pet. For example, the user can create a sleeping event that details the duration of seep for the pet, or the times and quantity of food that the pet consumed on a particular date. The logged events can help with the tracking or monitoring of the pet.

In certain non-limiting embodiments, the data collected via the one or more sensors can be combined with data collected from other sources. In one non-limiting example, the data collected from the one or more sensors can be combined with video and/or audio data acquired using a video recording device. Combining the data from the one or more sensors and the video recording device can be referred to as data preparation. During data preparation, the video and/or audio data can utilize video labeling, such as behavioral labeling software. The video and/or audio data can be synchronized and/or stored along with the data collected from the one or more sensors. The synchronization can include comparing sensor data to video labels, and aligning the sensor data with the video labels to minute, second, or sub-second accuracy. The data can be aligned manually by a user or automatically, such as using a semi-supervised approach to estimate offset. The combined data from the one or more sensors and video recording device can be analyzed using machine learning or any of the algorithms describes herein. The data can also be labeled as training data, validation data, and/or test data.

The data can be sensed, detected, or collect either continuously or discretely, as discussed in FIG. 4 with respect to location data. In certain non-limiting embodiments, the activities of the pet can be continuously sensed or detected by the wearable device, with data being continuously collected, but the wearable device can discretely transmit the information to the server in order to save battery power and/or network resources. In other words, the wearable device can continuously monitor or track the pet, but transmit the collected data every finite amount of time. The finite amount of time used for transmission, for example, can be one hour.

In step 501, the data related to the pet from the wearable device can be received at a server and/or the mobile device of the user. Once received, the data can be processed by the server and/or mobile device to determine one or more health indicators of the pet, as shown in step 502. The server can utilize a machine learning tool, for example, such as a deep neural network using convolutional neural network and/or recurrent neural network layers, as described below. The machine learning tool can be referred to as an activity recognition algorithm or model, and can including one or more modules. Using this machine learning tool, health indicators, also referred to as behaviors of the pet wearing the device, can be determined.

The one or more health indicators comprise a metric for itching, scratching, licking, walking, drinking, eating, sleeping, sleep disruptions, and shaking. The metric can be, for example, the distance walked, time slept, irregular or excessive movements during sleep time, and/or an amount of itching by a pet. The machine learning tool can be trained. To train the machine learning tool, for example, the server can aggregate data from a plurality of wearable devices. The aggregation of data from a plurality of wearable devices can be referred to as crowd-sourcing data. The collected data from one or more pets can be aggregated and/or classified in order to learn one or more trends or relationships that exist in the data. The learned trends or relationships can be used by the server to determine, predict, and/or estimate the health indicators from the received data. The health indicators can be used for determining any behaviors exhibited by the pet, which can potentially impact the wellness or health of the pet. Machine learning can also be used to model the relationship between the health indicators and the potential impact on the health or wellness of the pet. For example, the likelihood that a pet can be suffering from an ailment or set of ailments, such as dermatological disorders. The machine learning tool can be automated and/or semi-automated. In semi-automated models, the machine learning can be assisted by a human programmer that intervenes with the automated process and helps to identify or verify one or more trends or models in the data being processed during the machine learning process.

In certain non-limiting embodiments, the machine learning tool used to convert the data, such as time series accelerometer readings, into predicted health indicators can use windowed methods that predict behaviors for small windows of time. Such embodiments can produce a single prediction per window. On the other hand, other non-limiting embodiments rather than using small windows of time, and data included therein, the machine learning tool can run on an aggregated amount of data. The data received from the wearable device can be aggregated before it can be fed into the machine learning tool, thereby allowing an analysis of a great number of data points. When the data is aggregated more than once, there can be a hierarchy established on the data aggregation. The hierarchy can be based on the periodicity of the data bins in which the aggregated data are placed, with each reaggregation of the data reducing the number of bins into which the data can be placed.

In certain non-limiting embodiments, the collected and aggregated data can be displayed to the user through, for example, a mobile application on a user device. The aggregated data can be displayed in any format known in the art, for example, a table, a graph, a chart, or text. As another example, the collected and aggregated data can be displayed over time to identify trends (e.g., the amount of sleep the pet gets over a week, the amount of food the pet consumes every month, etc.). Displaying this data to the user in a variety of formats can provide benefits related to pet heath and wellness (e.g., identifying illness based on a pet's loss of appetite or energy), as well as other advantages descried herein.

In step 503, a wellness assessment of the pet based on the one or more health indicators can be performed. The wellness assessment, for example, can include an indication of one or more diseases, health conditions, and/or any combination thereof, as determined and/or suggested by the health indicators. The health conditions, for example, can include one or more of: a dermatological condition, an ear infection, arthritis, a cardiac episode, a tooth fracture, a cruciate ligament tear, a pancreatic episode, insomnia, and/or any combination thereof. In certain non-limiting embodiments, the server can instruct the wearable device to turn on an illumination device based on the wellness assessment of the pet, as shown in step 504. In step 505, the health indicator can be compared to one or more stored health indicators, which can be based on previously received data. If a threshold different is detected by comparing the health indicator with the stored health indicator, the wellness assessment can reflect such a detection. For example, the server can detect that the pet is sleeping less by a given threshold, itching more by a given threshold, of eating less by a given threshold. Based on these given or preset thresholds, a wellness assessment can be performed. In some non-limiting embodiments, the thresholds can also be determined using the above described machine learning tool. The wellness assessment, for example, can identify that the pet is overweight or that the pet can potentially have a disease.

In step 506, the server can determine a health recommendation or fitness nudge for the pet based on the wellness assessment. A fitness nudge, in certain non-limiting embodiments, can be an exercise regimen for a pet. For example, a fitness nudge can be having the pet walk a certain number of steps per day and/or run a certain number of steps per day. The health recommendation or fitness nudge, for example, can provide a user with a recommendation for treating the potential wellness or health risk to the pet. Health recommendation, for example, can inform the user of the wellness assessment and recommend that the user take the pet to a veterinarian for evaluation and/or treatment, or can provide specific treatment recommendations, such as a recommendation to feed pet a certain food or a recommendation to administer an over the counter medication. In other non-limiting embodiments, the health recommendation can include a recommendation for purchasing one or more pet foods, one or more pet products and/or any combination thereof. In steps 507 and 508, the wellness assessment, health recommendation, fitness nudge and/or any combination thereof can be transmitted from the server to the mobile device, where the wellness assessment, the health recommendation and/or the fitness nudge can be displayed, for example, on a graphic user interface of the mobile device. In particular non-limiting embodiments, the user can earn rewards for following the wellness recommendations, or for achieving certain goals. For example, if a pet achieves a certain number of steps in a given day, a reward can be provided to the pet owner through the mobile application. The reward can be a virtual reward, such as coins or points on the mobile application, or a real-world reward, such as a pet product or treat.

In some non-limiting embodiments, the data received by the server can include location information determined or obtained using a GPS. The data can be received via a GPS received at the wearable device and transmitted to the server. The location data can be used similar to any other data described above to determine one or more health indicators of the pet. In certain non-limiting embodiments, the monitoring of the location of the wearable device can include identifying an active wireless network within a vicinity of the wearable device. When the wearable device is within the vicinity of the wearable device, the wearable device can be connected to the wireless network. When the wearable device has exited the geo-fence zone, the active wireless network can no longer be in the vicinity of the wearable device. In other embodiments, the geo-fence can be predetermined using latitude and longitudinal coordinates.

Certain non-limiting embodiments can be directed to a method for data analysis. The method can include receiving data at an apparatus. The data can include at least one of financial data, cyber security data, electronic health records, acoustic data, human activity data, or pet activity data. The method can also include analyzing the data using two or more layer modules. Each of the layer modules includes at least one of a many-to-many approach, striding, downsampling, pooling, multi-scaling, or batch normalization. In addition, the method can include determining an output based on the analyzed data. The output can include a wellness assessment, a health recommendation, a financial prediction, or a security recommendation. The two or more layers can include at least one of full-resolution convolutional neural network, a first pooling stack, a second pooling stack, a resampling step, a bottleneck layer, a recurrent stack, or an output module. In some embodiment, the determined output can be displayed on a mobile device.

As described in the example embodiments shown in FIG. 5, the data can be received, processed, and/or analyzed. In certain non-limiting embodiments, the data can be processed using a time series classification algorithm. Time series classification algorithms can be used to assess or predict data over a given period of time. An activity recognition algorithm that tracks a pet's moment-to-moment activity over time can be an example of a time series classification algorithm. While some time series classification algorithms can utilize K-nearest neighbors and support vector machine approaches, other algorithms can utilize deep-learning based approaches, such as those examples described below. In certain non-limiting embodiments, the activity recognition algorithm can utilize machine learning models. Machine learning models and activity recognition algorithms are described further in PCT Application No. PCT/US2020/039909, filed Jun. 26, 2020, entitled "System and Method for Wellness Assessment," hereby incorporated by reference in its entirety.

In certain non-limiting embodiments a system, method, or apparatus can be used to assess pet wellness. As described above, data related to the pet can be received. The data can be received from at least one of the following data sources: a wearable pet tracking or monitoring device, genetic testing procedure, pet health records, pet insurance records, and/or input from the pet owner. One or more of the above data sources can collected using separate sources. After the data is received it can be aggregated into one or more databases. The process or method can be performed by any device, hardware, software, algorithm, or cloud-based server described herein.

Based on the received data, one or more health indicators of the pet can be determined. For example, the health indicators can include a metric for licking, scratching, itching, walking, sleeping, and/or sleep disruptions by the pet. For example, a metric can be the number of minutes per day a pet spends sleeping, and/or the number or minutes per day a pet spends walking, running, or otherwise being active. Any other metric that can indicate the health of a pet can be determined. In some non-limiting embodiments, a wellness assessment of the pet can be performed based on the one or more health indicators. The wellness assessment, for example, can include evaluation and/or detection of dermatological condition(s), dermatological disease(s), ear/eye infection, arthritis, cardiac episode(s), cardiac condition(s), cardiac disease(s), allergies, dental condition(s), dental disease(s), kidney condition(s), kidney disease(s), cancer, endocrine condition(s), endocrine disease(s), deafness, depression, insomnia, sleep apnea, rapid eye movement (REM) behavioral disorders pancreatic episode(s), pancreatic condition(s), pancreatic disease(s), obesity, metabolic condition(s), metabolic disease(s), and/or any combination thereof. The wellness assessment can also include any other health condition, diagnosis, or physical or mental disease or disorder currently known in veterinary medicine.

Based on the wellness assessment, a recommendation can be determined and transmitted to one or more of a pet owner, a veterinarian, a researcher and/or any combination thereof. The recommendation, for example, can include one or more health recommendations for preventing the pet from developing one or more of a disease, a condition, an illness and/or any combination thereof. The recommendation, for example, can include one or more of: a food product, a pet service, a supplement, an ointment, a drug to improve the wellness or health of the pet, a pet product, and/or any combination thereof. In other words, the recommendation can be a nutritional recommendation. In some embodiments, a nutritional recommendation can include an instruction to feed a pet one or more of: a chewable, a supplement, a food and/or any combination thereof. In some embodiments, the recommendation can be a medical recommendation. For example, a medical recommendation can include an instruction to apply an ointment to a pet, to administer one or more drugs to a pet and/or to provide one or more drugs for or to a pet.

In other non-limiting embodiments, a surcharge and/or discount can be determined and/or applied to a base cost or premium for a health insurance policy of the pet. This determination can be either automatic or manual. Any updates to the surcharge and/or discount can be determined periodically, discretely, and/or continuously. For example, the surcharge or discount can be determined periodically every several months or weeks. In some non-limiting embodiments, the surcharge or discount can be determined based on the data received after a recommendation has been transmitted to one or more pet owner. In other words, the data can be used to monitor and/or track whether one or more pet owners are following and/or otherwise complying with one or more provided recommendations. If a pet owner follows and/or complies with one or more of the provided recommendations, a discount can be assessed or applied to the base cost or premium of the insurance policy. On the other hand, if one or more pet owners fails to follow and/or comply with the provided recommendation(s), a surcharge and/or increase can be assessed or applied to the base cost or premium of the insurance policy. In certain non-limiting embodiments the surcharge or discount to the base cost or premium can be determined based on one or more of the data, wellness assessment, and/or recommendation.

Figure 6:
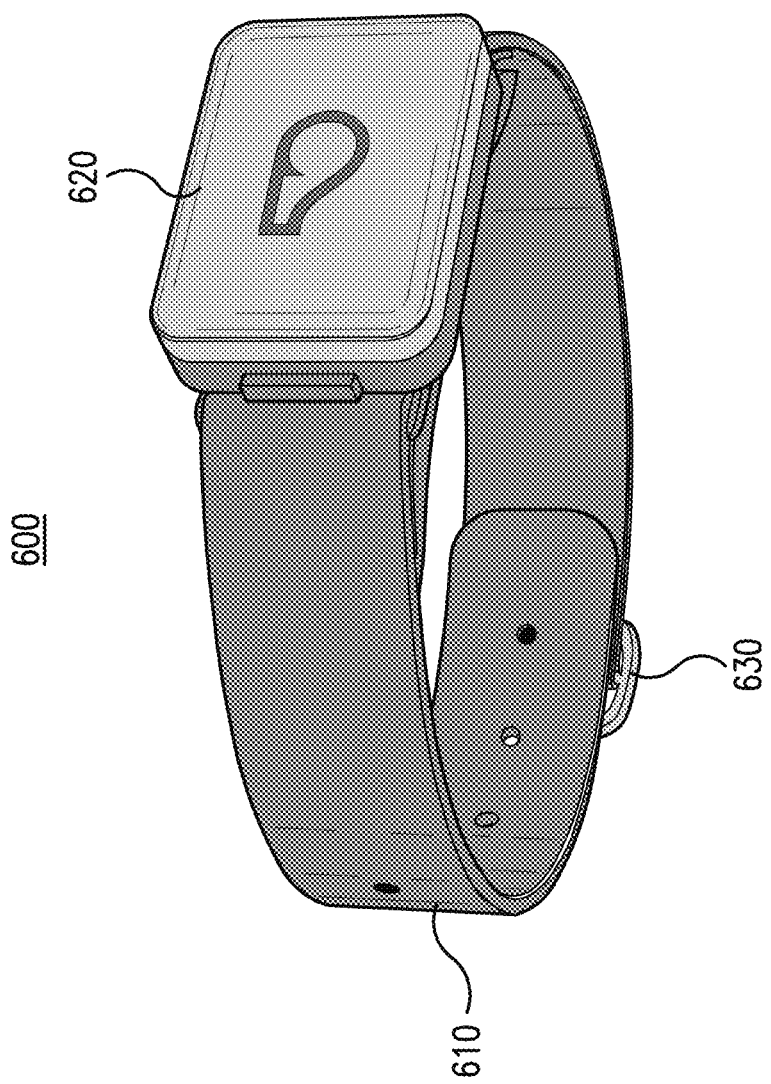
FIG. 6 illustrates a perspective view of a wearable device according to certain non-limiting embodiments.

As noted above, the tracking device according to the disclosed subject matter can comprise a computing device designed to be worn, or otherwise carried, by a user or other entity, such as an animal. The wearable device can take on any shape, form, color, or size. In one non-limiting embodiment, the wearable device can be placed on or inside the pet in the form of a microchip. Alternatively, and as embodied herein, the tracking device can be a wearable device that is couplable with a collar band, which can also be referred to as simply a collar, a pet collar, or a band. The collar band can be sized to fit all sized pets, whether it be small, medium, or large pets. FIG. 6 is a perspective view of a wearable device 600 having a band 610 with a tracking device, which can also be referred to as a wearable device. The tracking device can include a tracking component and a removable battery component 620, according to certain embodiments of the disclosed subject matter. In some non-limiting embodiments, band 610 can include an adjustment mechanism 630. Band 610 can be made of leather, nylon, rubber, polyester, hemp, or another suitable material. Although FIGS. 6A and 6B depict adjustment mechanism 630 as a buckle for securing the wearable device 600 around a pet's neck, other embodiments can utilize any suitable adjustment mechanisms for securing wearable device 600, for example, a side-release buckle, a strap, a snap hook, D-rings, or O-rings. In certain non-limiting embodiments, these adjustment mechanisms can be constructed of any suitable materials, for example metal, plastic, or nylon.

Figure 7A:
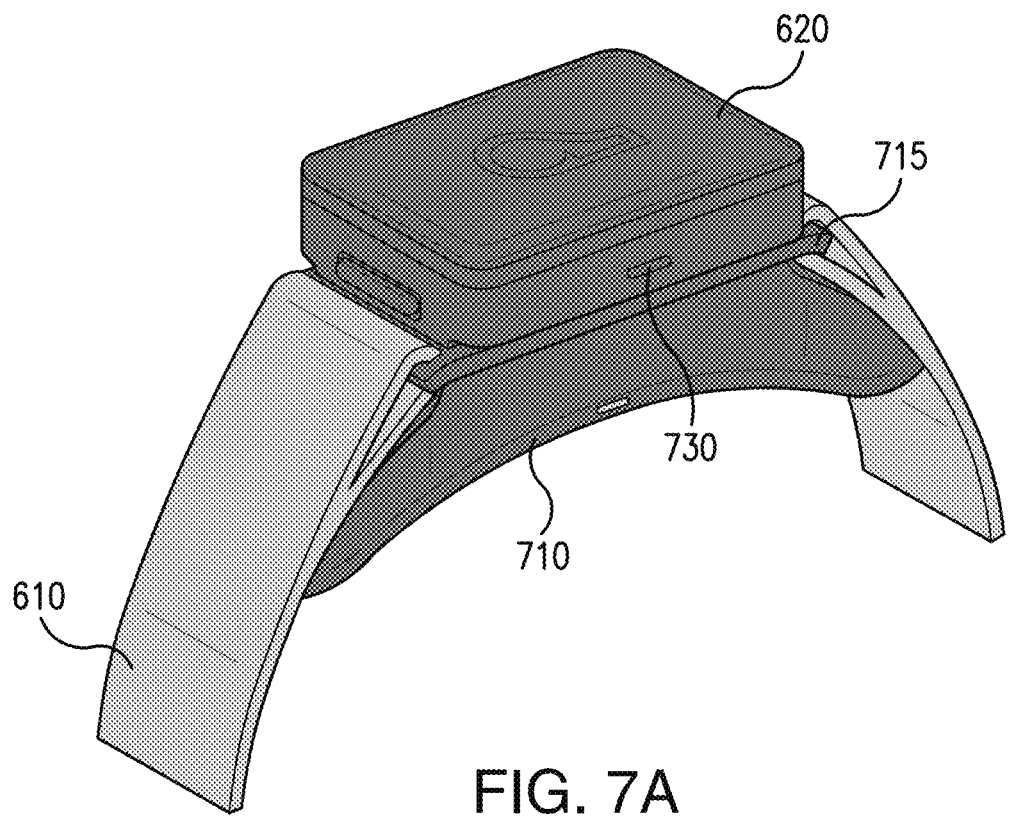
FIGS. 7A and 7B illustrate perspective and side views of a wearable device according to certain non-limiting embodiments.
Figure 7B:
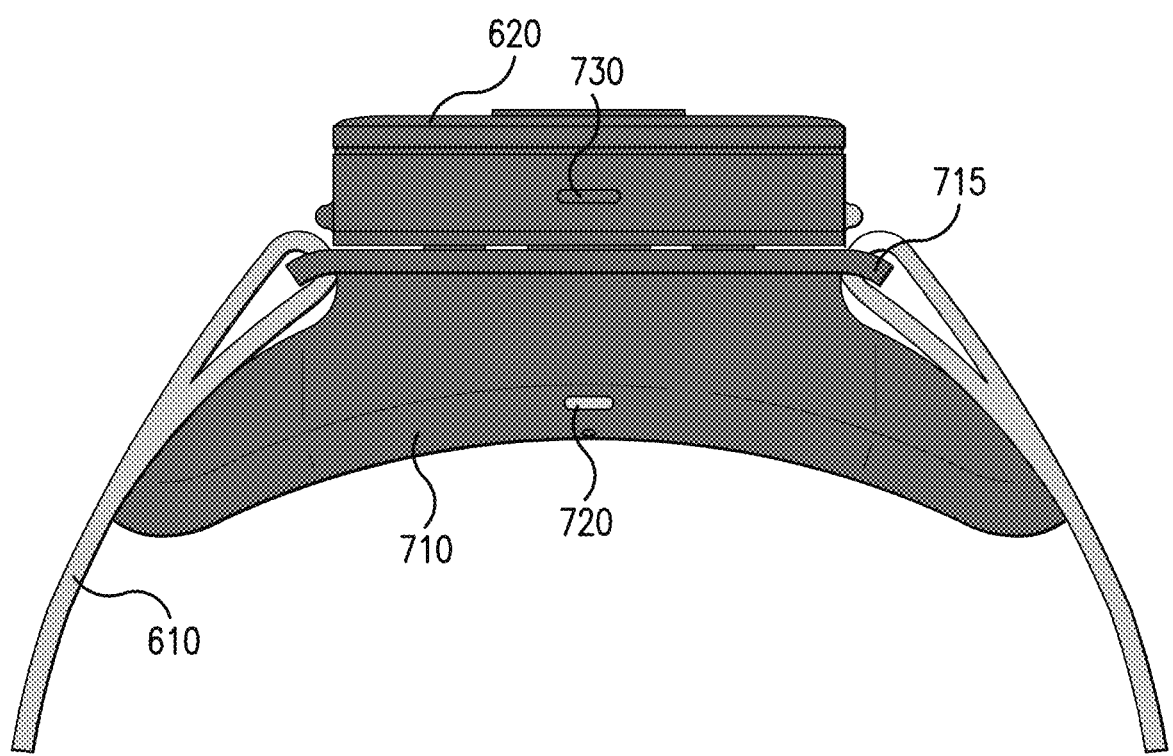

FIGS. 7A and 7B illustrate perspective and side views of a wearable device according to certain non-limiting embodiments. In some non-limiting embodiments, tracking device 600, also referred to as a wearable device 600, can include tracking component 710 and battery component 620. Battery component 620 can be a removable component of tracking device 600, which can include a removeable battery component and a tracking component. In certain non-limiting embodiments, the removable battery component 620 can be located on the outside of the band (i.e., on the outer edge of the collar when worn by a pet), whereas the tracking component 710 can be located on the inside of the band (i.e., on the inner edge of the collar when worn by a pet). In some other non-limiting embodiments, both the removeable battery components and the tracking component can be located on the outside of the band.

Tracking component 710 can be shaped to fit the contours of a pet. For example, a surface of the tracking component, such as a bottom surface of the bottom cover, can be at least partially curved relative to the strap plate to conform or align with the curved shape of a pet's neck. In some non-limiting embodiments the curvature of the tracking component can be based on the weight or size of the pets. For example, larger pets can require less curvature in the tracking component. Tracking component 710 can be attached to band 610 via strap plate 715 through, for example and not by way of limitation, one or more screws, bolts, or any other suitable attachment or fastening mechanism. Tracking component 710 and removable battery component 620, for example, can include one or more indicators 720 and 730, respectively. Indicators 720 and 730 can be, for example, an LED or other light indicator, and provide a visual indication of the wireless connectivity of tracking device 710, the state of charge of removable battery component 620, or whether battery component 620 is connected to tracking component 710.

Figure 8:
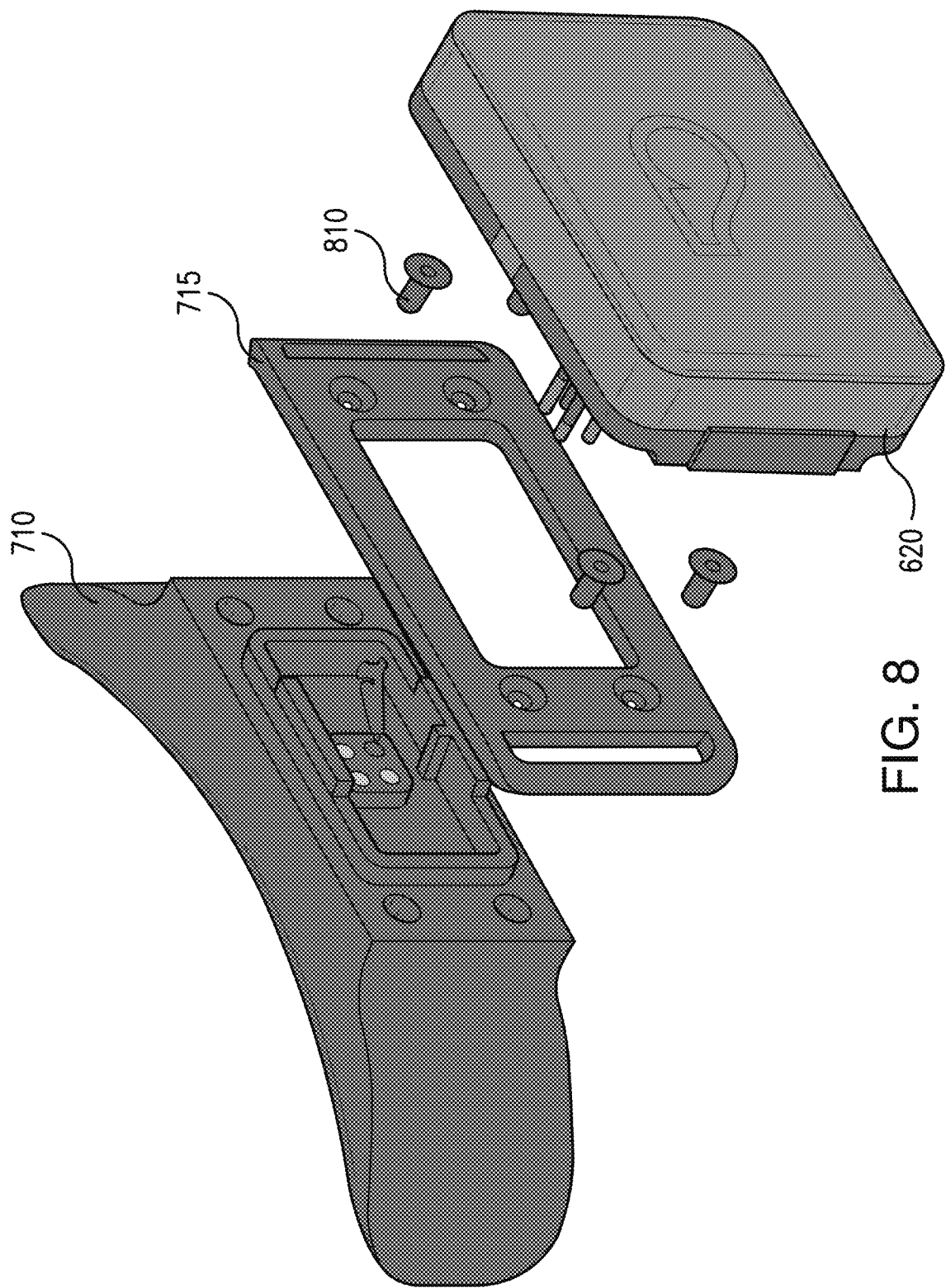
FIG. 8 illustrates an expanded view of the wearable device according to certain non-limiting embodiments.

FIG. 8 illustrates an expanded view of the wearable device according to certain non-limiting embodiments. In certain non-limiting embodiments, tracking component 710 can be attached, such as coupled or connected, to strap plate 715 through, for example and not by way of limitation, one or more screws 810, bolts, or any other suitable fastener. In some non-limiting embodiments, the coupling can be such that the tracking component 710 and strap plate 715 are interchangeable (e.g., the use of screws such that a user can remove and replace the tracking component 710 and/or strap plate 715). In other non-limiting embodiments, the coupling can be such that tracking component 710 is glued or molded to strap plate 715. Removable battery component 620 can be attached, such as coupled or connected, to strap plate 715 via one or more battery latches or attachments.

FIGS. 9A and 9B illustrate expanded and back views of a removable battery component according to certain non-limiting embodiments. As shown in FIG. 9A, the removable battery component 620 can be rectangular shaped. In other embodiments the removable battery 620 can have any other suitable shape, such as oval, square, or bone shape. The removable battery component 620 can have any suitable dimensions. For example, the removeable battery 620 dimensions can be selected such that a pet can reasonably carry the device. For example, the wearable device can have a width of 30.13 millimeters, a height or length of 42.00 millimeters, and a thickness or depth of 11.09 millimeters. The size of the removable battery component 620 can vary based on the size of the battery 950 (e.g., a smaller battery 950 results in a smaller removable battery component). In some non-limiting embodiments removeable battery component 620 can be shock resistant and/or waterproof In an example embodiment, the connection between one or more contact units 9100 shown in FIG. 9B, and complementary one or more receiving contact units 1080 shown in FIG. 10A, can be waterproof. Accordingly, when removable battery component 620 and tracking components 710 are connected, the connection points between the two components can be water proof.

In certain non-limiting embodiments the removeable battery component 620 comprises a housing that can include a top cover 910 and a bottom cover 920 attached, such as coupled or connected, with the top cover. As shown in FIGS. 9A and 9B, the top cover 910 of removable battery component 620 is separable from the bottom cover 920 and both components can further be separately constructed units that are coupled together. The top cover 910 can comprise a first material and the bottom cover 920 can comprise a second material such that the first material is different from the second material. In other embodiments, the first and second material can be the same. These materials can include, for example, plastic, metals, or any suitable material. In certain non-limiting embodiments, the top cover 910 and bottom cover 920 can include a coating or finish, for example a polished Physical Vapor Deposition (PVD)-coated gloss or high-gloss finish, or a PVD-coated matte finish.

The housing of the removable battery component 620, such as the top cover 910 and bottom cover 920, can include indicia 915, such as any suitable symbols, text, insignias, and the like.

In some non-limiting embodiments the bottom cover 920 can further comprise one or more battery latches 930 for connecting removeable battery component 620 to strap plate 715. A battery latch 930 can utilize, for example, one or more latch springs 940 or other suitable mechanisms to connect removable battery component 620 to strap plate 715. An added advantage of a pressure-based latch (e.g., a spring) is the removable battery component 620 can be separated from the wearable device upon receiving a threshold quantity of force on the latch. The battery latch 930 provides easy interchangeability, which provides for extended battery-life and reduced downtime by allowing a user to swap the removable battery component, while still allowing the curved tracking component to remain attached the band or collar. In some other examples, removing the removable battery component, can release both the removable battery components and the tracking component from the band or collar. In addition to providing easy interchangeability, the press-based battery latch can also release when an unexpected load is applied, which reduces the risk a pet being caught or trapped by the removable battery component 620 being lodged against an object (e.g., a door).

Figure 10A:
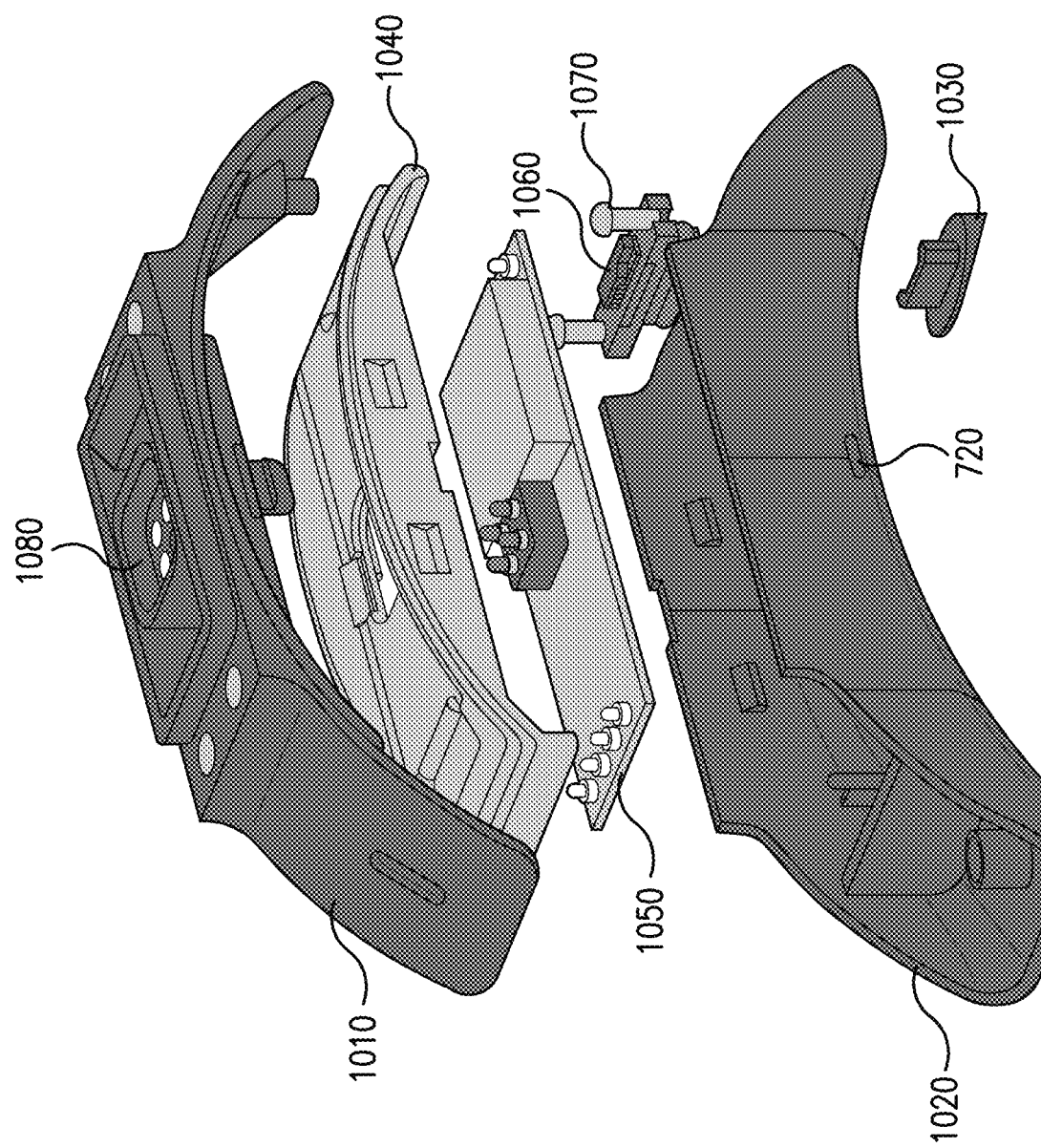
FIGS. 10A-10D illustrate an expanded, top, side and bottom view of a tracking component according to certain non-limiting embodiments.
Figure 10B:
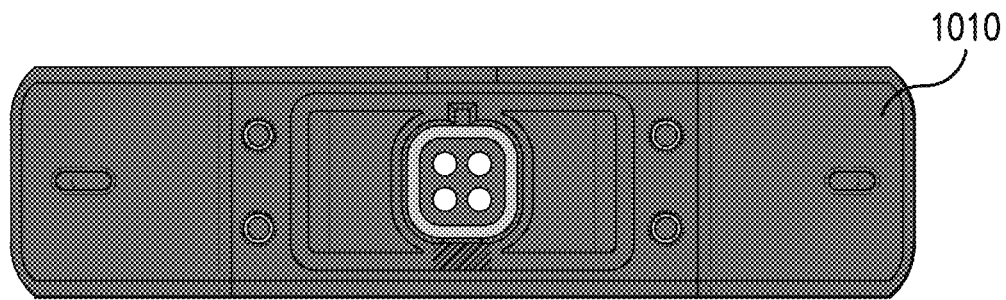

In certain non-limiting embodiments, the removable battery component can be swapped for one or more other removable battery components. Tracking components can initially be attached to removeable battery component. A user can then decide to swap the initial removable battery component with one or more other removable battery components. The one or more other removable battery components can be attached to the same tracking component attached to the initial removable battery component. One or more contact units 9100, as shown in FIG. 9B, located on the bottom surface of removable battery component can oppose one or more complementary receiving contact units 1080, as shown in FIG. 10A. Receiving contact unit 1080 is located on the top surface of tracking component, which can be centrally located opposite the curved bottom surface of the tracking component.

As shown in the expanded view of the removable battery component in FIG. 9A, the housing can further enclose the inner mechanisms for the functional operation of the removable battery, such as a battery 950, battery cushion 960, battery Printed Circuit Board Assembly 970 (battery PCBA) comprising one or more sensors, double-sided battery tape 980, USB port 990, and inner hardware 995, such as one or more screws, to couple together one or more components of the removable battery component 620, amongst other mechanisms. In some non-limiting embodiments the capacity of the battery 950 can be varying sizes based on the needs of the particular user (e.g., an "extended" extra-large battery for a camping trip, etc.). Battery PCBA 970 can detect charge levels using, for example, a fuel gauge, monitor voltage, and validate the battery of removable battery component 620. Validating the battery can include determining whether or not the battery used by removable battery component 620 is genuine. PCBA 970 can also detect battery overcharge and/or include thermal protection circuitry.

The housing of removable battery component 620 can further include a status indicator 730 such as an illumination device (such as but not limited to a light or light emitting diode), a sound device, or a vibrating device. The indicator can be housed within the housing or can be positioned on the top cover of the device. As best shown in FIG. 9A, a status indicator 730 is depicted and embodied as a light on the bottom cover 920. However, the illumination device can alternatively be positioned within the housing to illuminate at least the top cover 910 of the removable battery component 620. In other embodiments, a sound device and/or a vibrating device can be provided with the removable battery component 620. The sound device can include a speaker and make sounds such as a whistle or speech upon a trigger event. As discussed herein, the status indicator 730 can be triggered upon predetermined level of charge in removable battery component 620. In certain non-limiting embodiments, the status indicator 730 can have different colors indicating the charge level of the battery in removable battery component 620. Although status indicator 730 is shown as a light, in other embodiments not shown in FIGS. 9A and 9B, the illumination device can be replaced with an illumination device, a sound device, and/or a vibrating device.

The status indicator 730 can communicate a status of the device, such as a charging mode (reflective of a first color), an engagement mode (such as when interacting with a Bluetooth communication and reflective of a second color), and a fully charged mode (such as when a battery life is above a predetermined threshold and reflective of a third color). For example, when the indicator 730 is amber colored the wearable can be charging. On the other hand, when indicator 730 is green the battery of the wearable device can be said to be fully charged. Other status modes and colors thereof of status indicator 730 are contemplated herein. The status indicator 730 can furthermore blink or have a select pattern of blinking that can be indicative of a certain status. In particular embodiments the status indicator 730 on tracking component 710 can form a light tunnel with status indicator 620 on removable battery component 620.

For example, both status indicators can appear as the same color when the tracking component 710 is connected to removable battery component 620. As another example, the one or both of the status indicators can change color when the tracking component 710 is disconnected to removable battery component 620. The top cover 1010 can include any suitable color and pattern, and can further include a reflective material or a material that glows in the dark.

FIG. 9B depicts a back view of the removable battery component 620, according to the disclosed subject matter. In certain non-limiting embodiments, removeable battery 620 further comprises a contact unit 9100, and a USB 9200, which can be used to connect a cable, such as a USB cable or the like, to transmit data and/or to charge the removeable battery component 620. Contact unit 9100 can be constructed of any suitable material for electrically connecting and transmitting power from removable battery component 620 to tracking component 710, for example, nickel, tin, phosphor bronze, or steel. The charging port can be, for example, a type-A universal serial bus ("USB") port, a type-B USB port, a mini-USB port, a micro-USB port, or any other type of port. In some other non-limiting embodiments, the removable battery component 620 can be wirelessly charged.

FIGS. 10A-10D illustrate an expanded, top, side and bottom view of a tracking component according to certain non-limiting embodiments. As shown in FIG. 10A, the tracking component 710 comprises a housing that can include a top cover 1010 and a bottom cover 1020 attached, such as coupled or connected, together. In some non-limiting embodiments, at least one side of the tracking component 710 can be shaped to fit the contours of a pet. For example, tracking component can in part have a curved shape to conform to the curved shape of a pet's neck. In certain non-limiting embodiments, the other side of the tracking component can be flat to facilitate connection of the tracking component with the tracking component 710. In other embodiments the tracking component 710 can have any other suitable shape, such as a rectangular prism. The tracking component 710 can have any suitable dimensions. For example, the removeable battery 620 dimensions can be selected such that a pet can reasonably carry the device. For example, the wearable device can have a width of 20.00 millimeters, a height or length of 78.00 millimeters, and a thickness or depth of 15.50 millimeters. In certain non-limiting embodiments tracking component 710 can be waterproof and/or shock resistant.

Figure 10C:
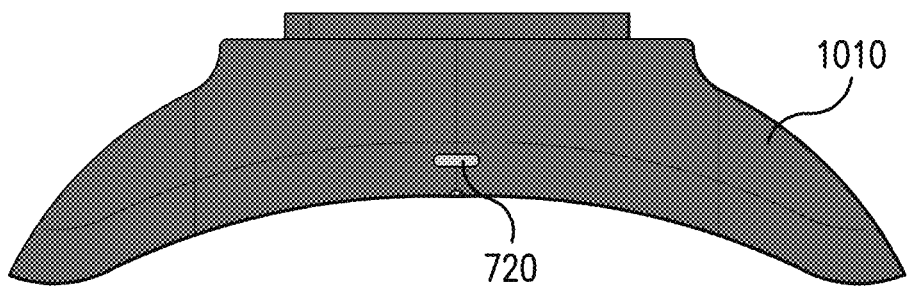
Figure 10D:
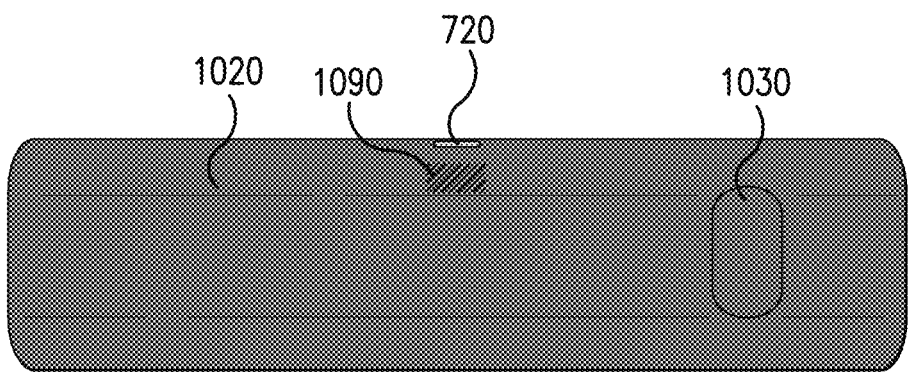

As depicted in FIG. 10A and FIG. 10D, in some non-limiting embodiments the bottom cover 1020 can further comprise one or more USB port covers 1030, which can cover a type-A universal serial bus ("USB") port 1060, a type-B USB port, a mini-USB port, a micro-USB port, or any other type of port. In certain non-limiting embodiments, USB port 1060 can be used to connect a cable, such as a USB cable or the like, to transmit data and/or to charge the tracking component 710. In some other non-limiting embodiments, the tracking device 710 can be wirelessly charged. In certain other non-limiting embodiments the tracking component 710 can comprise a complementary receiving contact unit 1080. Receiving contact unit 1080 can be constructed of any suitable material for connecting and transmitting power from removable battery component 620 to tracking component 710, for example, nickel, tin, phosphor bronze, or steel.

As shown in the exploded view of FIG. 10A, the tracking component 710 can further include the inner mechanisms for the functional operation of the tracking component, such as antenna carrier 1040, main Printed Circuit Board Assembly 1050 (PCBA), USB port 1060, and inner hardware 1070, such as one or more screws, to couple together one or more components of the tracking component 710, amongst other mechanisms. The antenna carrier 1040 can be constructed of a specialized polycarbonate component that is compatible with the Laser Direct Structuring (LDS) process that "deposits" or plates the antenna pattern on the physical carrier. The antenna can be a Bluetooth antenna, near field communication antenna, cellular communication antenna, WLAN antenna, or any other antenna that helps to facilitate communications and/or location tracking.

As shown in FIG. 10A, the top cover 1010 of the tracking component 710 is separable from the bottom cover 1020 and both components can further be separately constructed units that are attached, such as coupled or connected, together. As shown in FIG. 10A, the top cover 1010 of tracking component 710 is separable from the bottom cover 1020 and can further be separately constructed units that are attached, such as coupled or connected, together. The top cover 1010 can comprise a first material and the bottom cover 1020 can comprise a second material such that the first material can be different from the second material. In other embodiments, the first and second material can be the same. These materials can include, for example, plastic, metals, or any suitable material. In some non-limiting embodiments, the top cover 1010 and bottom cover 1020 can include a coating or finish, for example a polished PVD-coated gloss or high-gloss finish, or a PVD-coated matte finish. The housing of the tracking component 710, such as the top cover 1010 and bottom cover 1020, can include indicia, such as any suitable symbols, text, insignias, and the like. Further, the housing can include personalized features, such as an engraving that features the wearer's name or other identifying information, such as a pet owner name and phone number. One or more indicia can include one or more aesthetic features, for example a debossed finish, a metal sticker on a debossed surface, or other aesthetic features. FIGS. 10A-10D show various perspectives of tracking component 710, which can further include the above noted indicia, as desired.

The housing of tracking component 710 can further include a status indicator 720 such as an illumination device (such as but not limited to a light or light emitting diode), a sound device, and a vibrating device. The status indicator 720 can be housed within the housing or can be positioned on the bottom cover 1020 of the device. As best shown in FIG. 10C, an illumination device is depicted and embodied as a light on the bottom cover 1020. However, the illumination device can alternatively be positioned within the housing to illuminate at least the top cover 1010 of the tracking component. In other embodiments, a sound device and/or a vibrating device can be provided with the tracking component 710. The sound device can include a speaker and make sounds such as a whistle or speech upon a trigger event. In certain non-limiting embodiments, the status indicator 720 can have different colors indicating the charge level of the battery and/or the type of radio access technology to which wearable device 710 is connected. In certain non-limiting embodiments, status indicator 720 can be the illumination device described in FIG. 4. In other words, the status indicator 720 can be activated manually or automatically once the pet exits the geo-fence zone. Alternatively, or in addition to, a user can manually activate status indicator 720 using an application on the mobile device based on data received from the wearable device. Although status indicator 720 is shown as a light, in other embodiments not shown in FIGS. 10A-10D, the status indicator 720 can be replaced with an illumination device, a sound device, and/or a vibrating device.

The status indicator 720 can communicate a status of the device, such as a charging mode (reflective of a first color), an engagement mode (such as when interacting with a Bluetooth communication and reflective of a second color), and a fully charged mode (such as when a battery life is above a predetermined threshold and reflective of a third color). For example, status indicator 720 can be blue, meaning that tracking device 710 is either connected via Bluetooth and/or currently communicating with another device via a Bluetooth network. In certain non-limiting embodiments, the wearable device using the Bluetooth Low Energy (BLE) can be advantageous. BLE can be a wireless personal network that can help to reduce power and resource consumption by the wearable device. Using BLE can therefore help to extend the battery life of the wearable device. Other status modes and colors thereof of status indicator 720 are contemplated herein. The status identifier can furthermore blink or have a select pattern of blinking that can be indicative of a certain status. The top cover 1010 can include any suitable color and pattern, and can further include a reflective material or a material that glows in the dark.

Returning to FIG. 10D, in certain non-limiting embodiments tracking component 710 can further comprise a light sensor 1090. In some non-limiting embodiments light sensor 1090 can be a red, green, blue (RGB) light sensor that utilizes the same light pipe as status indicator 730. A light pipe, for example, can be a light pathway that allows the light sensor to sense light from outside the tracking component and/or the battery device component. The openings of the light pipe can be located at the bottom covers of the tracking component and the battery device component. Light sensor 9040 located on the bottom of removable battery device 620, as shown in FIG. 9B, and light sensor 1090 located on the bottom of tracking component 710, as shown in FIG. 10D, can include one or more light pipes. When the light pipe is severed or interrupted, the light sensor can detect a change in light. This change in light, for example, can indicate that a pet who was previously located indoor in now located outdoor, or vice versa. Light sensor 1090 can be positioned on the inside of the tracking component 710 such that it faces the pet when the wearable device is worn by the pet. Light sensor 1090 provides additional sensor data to the computing system to detect the current light (and therefore the current environment) around the pet. As an example, current methods for detecting the location of the pet require using signal data, for example receiving a location through a GPS sensor, or determining a signal strength of a wireless network the tracking component 710 is connected to (e.g., a WiFi network). These methods are resource-intensive, and improving their accuracy increased strain on resources.

Instead, other non-limiting embodiments provide light sensor data to the computing system to determine, for example whether the pet is located indoors, outdoors, in a dark space, etc. The light sensor can improve detectability and accuracy of the location of the pet without an extensive drain of resources. A further benefit of light sensor 1090 is the ability to detect if the wearable device has fallen off or been removed from the pet. Because light sensor 1090 faces the insides of the wearable device, when the wearable device is removed the quantity and readings of light change dramatically, which makes it easy for the computing system to detect when the wearable device is removed. In certain non-limiting embodiments, this condition can trigger the computing system to transmit a notification to the mobile device of the user. In other non-limiting embodiments, the light sensor can persistently determine whether the pet is located outside or inside a geofence in accordance with the methods described herein, even when the tracking component is in power-saving mode or not connected to a network. The light sensor can be used in conjunction with an accelerometer on the tracking component, such that the light sensor continuously samples the ambient light environment and stores that information on the tracking component to be transmitted with the high-fidelity accelerometer data in accordance with the methods described herein.

Although not depicted in FIGS. 10A-10D, in some non-limiting embodiments tracking component 710 can further comprise one or more of an altimeter and a barometer for determining the location and/or the elevation of the wearable device. In certain non-limiting embodiments the computing system can receive sensor data from one or more of the altimeter and the barometer comprising, for example, a device elevation and/or a corresponding timestamp. The computing system can utilize the timestamp to determine a location that corresponds to the device elevation data based on the GPS data or network data. This additional data permits the computing system to determine a more accurate location of the wearable device. For example, if a user lives in a multi-story residential building, elevation data permits the computing system to determine whether the user's pet is located in the user's condo on the $14^{th}$ floor, at the outdoor space on the roof of the building, or in the lobby. In some non-limiting embodiments, the barometer or altimeter can trigger an output from the tracking component is not connected to a network or in power-saving mode. For example, a barometer reading can trigger sending a notification to a mobile device or an output on the tracking component itself (e.g., light, auditory, vibratory). In certain non-limiting embodiments, the altimeter and the barometer can help to determine the location of the tracking device. The location, for example, can include elevation, meaning vertical location of the tracking device.

Figure 11:
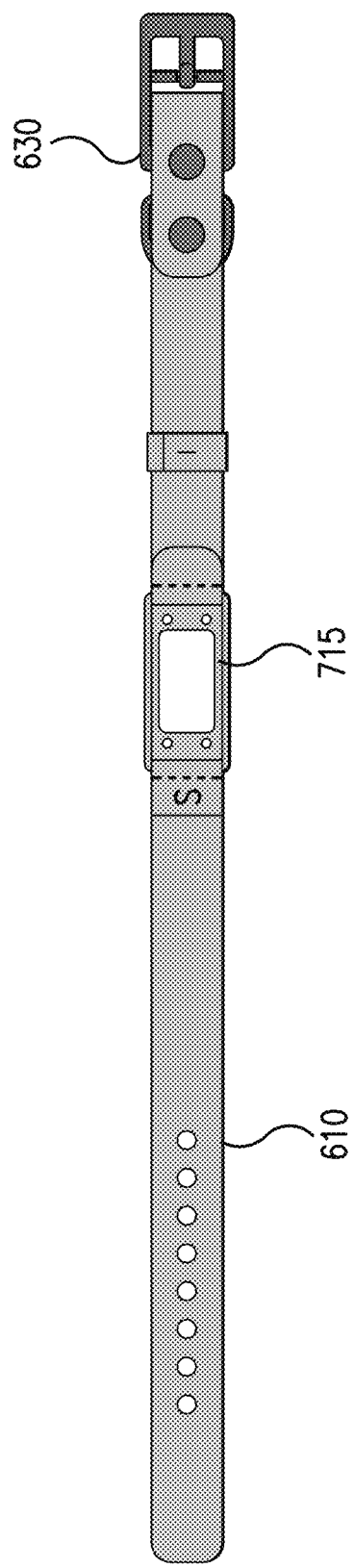
FIG. 11 illustrates a a bottom view of the band according to certain non-limiting embodiments.
Figure 12:
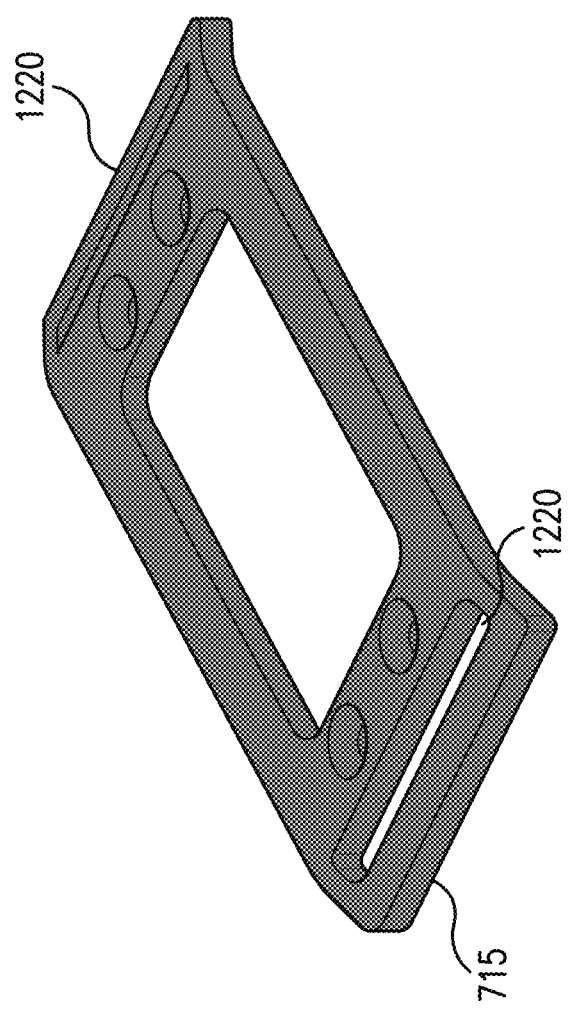
FIG. 12 illustrates a perspective view of the strap plate according to certain embodiments.

FIG. 11 illustrates a bottom view of a band according to certain non-limiting embodiments. In particular, FIG. 11 shows a view of the band 610 with the removable battery component 620 removed according to an embodiment of the disclosed subject matter. In certain non-limiting embodiments the band 610 can be a collar for a pet. In some non-limiting embodiments band 610 can be constructed of leather, nylon, rubber, polyester, hemp, or another suitable material. Band 610 can further comprise hardware for securing the wearable device 600 around, for example, a pet, for example, a buckle, snap buttons, a side-release buckle, a strap, a snap hook, one or more D-rings, or one or more O-rings. Any suitable clasping structure and adjustment mechanism is contemplated here. In certain non-limiting embodiments, these adjustment mechanisms can be constructed of any suitable materials, for example metal, plastic, or nylon. As shown in FIG. 11, the band 610 can further include additional accessories as known in the art. In particular, the band 610 can include adjustment mechanisms 630 to tighten or loosen the band and can further include a clasp to couple the band to a user, such as a pet. In some non-limiting embodiments, the band 610 can include particular adjustment mechanisms that are directed towards small, medium, or large pets. For example, bands constructed for small pets can include a plastic buckle, whereas bands for large pets can include a metal hook or ring to accommodate larger forces associated with larger pets. Band 610 can further include additional accessories, such as a name plate, stitching, overlapping, and/or a free-moving loop. The band 610 can also include indicia, such as any suitable symbols, text, and the like. Further, the band 610 can include personalized features, such as an engraving that features the wearer's name or other identifying information, such as a pet owner name and phone number.

In some non-limiting embodiments the tracking component 710 can be attached, such as coupled or connected, to band 610 via strap plate 715. The tracking component 710 device can couple with the band 610 in any suitable manner as known in the art, for example. An advantage of one or more embodiments described herein permits a user to interchange one or more bands 610 with the strap plate 715, thus permitting aesthetic and functional changes without having to purchase multiple tracking components (e.g., a rubber band for outdoor activities, a festive band for a holiday, etc.). In one non-limiting embodiment, the housing, such as the top cover 1010, can couple with a complementary strap plate 715 and/or directly to the band 610.

As described above, FIG. 12 illustrates a perspective view of the strap plate according to certain embodiments. Because the tracking component 710 (and therefore antennas) is located on the inside of the band 610, strap plate 715 can be constructed from one or more materials that do not interfere or block the cellular reception and/or radio frequency (RF) signals transmitted or received by tracking component 710. Thus, in certain non-limiting embodiments strap plate 715 can be composed or made of a material that doesn't not inhibit RF communications, for example carbon fiber.

Further, the strap plate can be made of any other durable, strong material, while also simultaneously limiting interference with signals being transmitted or received by the tracking device. In some non-limiting embodiments, specific pet sizes can correspond to different minimum tensile strength of the collar and/or strap plate located on the collar. For example, the tensile strength of a collar and/or strap plate can be 40 pounds (lbs) for a pet weighing up to 10 lbs, 80 lbs for a pet weighing up to 20 lbs, 250 lbs for a pet weighing up to 50 lbs, 450 lbs for a dog weighing up to 90 lbs, and 750 lbs for a dog weighing up to 150 lbs. The above-referenced tensile forces can also be referred to as a pull rating. Strap plate 715 can be constructed of a material that can withstand these tensile forces or pull rating. For example, the strength of a carbon fiber strap plate can withstand up to 186 kilogram-force (kgf) of tensile force. Accordingly, using a carbon fiber strap allows the band or collar, to which at least a part of the tracking or wearable device is attached, to meet the pull rating or tensile strength. As embodied herein, the support frame can include a receiving aperture and latch for coupling with the attachment device and/or insertion member of the tracking device.

The strap plate 715 can have any suitable dimensions. For example, the strap plate 715 dimensions can be selected such that they permit coupling with the removable battery component 620 and/or the tracking component 710. For example, the strap plate 715 can have a width of 24.00 millimeters, a height or length of 51.40 millimeters, and a thickness or depth of 2.00 millimeters.

FIGS. 13A-13D illustrate various examples of attaching a tracking device to a strap plate according to certain non-limiting embodiments. The strap plate 715 can be used to couple a tracking component 710 to the band 610. For example, tracking component 710 can be attached, such as coupled or connected, to the strap plate 715 via one or more screws (as illustrated in FIGS. 13A and 13B), via a latching mechanism (as illustrated in FIG. 13C), or via a pin mechanism, such as a 2 mm watch pin (as illustrated in FIG. 13D).

Any other attachment devices can be used, such as those described in U.S. Provisional Patent Application No. 62/768,414, titled "Collar with Integrated Device Attachment," filed on Nov. 16, 2018, and U.S. patent application Ser. No. 17/294,156, filed on May 14, 2021, the contents of which are hereby incorporated in their entirety.

Returning to FIG. 11, The band 610 can couple with the strap plate 715. For purpose of example, and as embodied in FIG. 11, the band 610 can include loops for coupling with the strap plate 715. Alternatively, the strap plate 715 can include channels 1220 on opposing sides of the support frame. The channels 1220 can be configured to receive and retain band 610 therein. For purpose of example, band 610 can be made of a flexible material such as rubber. The strap plate 715 can be fastened to a band 610 by looping the band 610 around the channels 1220 in the strap plate 715. Additionally, or alternatively, it can be desirable to couple tracking components in accordance with the disclosed subject matter to bands without loops or other suitable configuration for securing a strap plate 715. Although not depicted in FIG. 11, the strap plate 715 and/or band 610 can include, for example, a hook and loop collar attachment feature, a snap member, or similar mechanisms. As embodied herein, the strap plate can include one or more grooves configured to receive tabs on band 610. The strap plate 715 can be fastened to a band 610 by passing the band 610 through a channel on the strap plate 715 and engaging the tabs of the band 610 with the grooves of the strap plate 715. The tabs can include a lip or ridge to prevent separation of the band 610 from the support frame 715.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments can include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain non-limiting embodiments as providing particular advantages, certain non-limiting embodiments can provide none, some, or all of these advantages.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A wearable device for a pet comprising:
   a band comprising a strap plate;
   a housing including a removable battery component and an illumination device, wherein the illumination device is configured to illuminate based on a wellness assessment of the pet;
   a curved tracking component coupled with the housing, wherein the curved tracking component is configured to conform to a portion of the pet's body and wherein the curved tracking component comprises one or more processors and one or more non-transitory memories; and
   one or more sensors located within the curved tracking component,
   wherein the removable battery component is configured to be removably attached to the tracking component,
   wherein the wearable device is removably attached to the pet via the band,
   wherein the tracking component is removably attached to the strap plate, and
   wherein the one or more non-transitory memories further comprise instructions operable when executed by the one or more of the processors to cause the wearable device to:
   collect sensor data from the one or more sensors;
   detect a plurality of network conditions associated with a plurality of respective networks that the wearable device is connected to, wherein the wearable device communicates with a plurality of networked devices via the plurality of networks, and wherein the plurality of networked devices comprise at least a mobile device and a server;
   determine, for each of the plurality of networks, a format, a frequency, and content of the sensor data for transmission based on the network condition corresponding to that network;
   identify, based on the plurality of network conditions, one or more networked devices from the plurality of networked devices for data transmission;
   transmit the sensor data comprising the determined content in the determined format according to the determined frequency to each of the identified networked devices via the network associated with that identified networked device;
   generate, based on the sensor data, a wellness assessment of the pet, wherein the wellness assessment comprises a probability that the pet can be suffering from one or more of a disease or a health condition; and
   illuminate the illumination device based on the generated wellness assessment of the pet.

2. The wearable device of claim 1, wherein the removable battery component comprises one or more contact units, wherein the tracking device comprises one or more receiving contact units, and wherein the one or more contact units are configured to contact the one or more receiving contact units.

3. The wearable device of claim 1, wherein the removable battery component comprises:
   a top battery cover integrated with the removable battery component;
   a bottom battery cover;
   a battery component status indicator; and
   a battery, wherein the battery component status indicator is positioned on the bottom cover of the removable battery component, wherein the battery component status indicator is positioned on a side surface of the bottom cover.

4. The wearable device according to claim 3, wherein the tracking component comprises:
   a top tracking component cover;
   a bottom tracking component cover; and
   a tracking component status indicator.

5. The wearable device according to claim 4, wherein a surface of the bottom tracking component cover, is at least partially curved relative to the strap plate, and wherein a tracking component side surface is located between the top tracking component cover and the bottom tracking component cover.

6. The wearable device according to claim 4, wherein the tracking component status indicator is positioned on the bottom tracking component cover.

7. The wearable device according to claim 4, wherein the tracking component status indicator or the battery component status indicator is configured to turn on after the wearable device has exited a geo-fence zone.

8. The wearable device according to claim 4, wherein the tracking component further comprises a first light sensor, wherein the removable battery component further comprises a second light sensor, and wherein the first light sensor and the second light sensor detect light that enters through a light pipe located at the bottom tracking component cover and the bottom battery cover.

9. The wearable device according to claim 1, wherein the tracking component further comprises an altimeter and a barometer for determining a location of the wearable device, and wherein the location includes an elevation.

10. The wearable device according to claim 1, wherein an adjustment mechanism, for securing the wearable device around the pet, is connected to the band, and
wherein the adjustment mechanism comprises one or more of:
a side-release buckle;
a strap;
a snap hook;
one or more D-rings; or
one or more O-rings.

11. The wearable device according to claim 1, wherein the one or more non-transitory memories further comprise instructions operable when executed by the one or more of the processors to cause the wearable device to:
enter a power-saving mode, wherein the power-saving mode restricts or delays the execution of one or more work items performed by the wearable device.

12. The wearable device according to claim 1, wherein the strap plate is attached to the band at one or more channels on opposing sides of the strap plate, and wherein at least part of the band passes through the one or more channels.

13. The wearable device according to claim 1, wherein the removeable battery component is coupled to the strap plate by one or more pressure-based battery latches.

14. The wearable device according to claim 1, wherein the one or more non-transitory memories further comprise instructions operable when executed by the one or more of the processors to cause the wearable device to:
determine, based on the sensor data, one or more health indicators of the pet; and wherein the determining of the one or more health indicators further includes generating, based on the one or more health indicators of the pet, the wellness assessment of the pet.

15. The wearable device according to claim 14, wherein the one or more health indicators includes one or more selected from the group of licking, scratching, itching, walking, sleep, and/or sleep disruption.

16. The wearable device according to claim 14, wherein the determining of the one or more health indicators is performed by at least one of the wearable device, one or more servers, or a cloud-computing platform.

17. The wearable device according to claim 1, wherein one or more non-transitory memories further comprise instructions operable when executed by one or more of the processors to cause the wearable device to:
receive a request to enter a power-saving mode, wherein the power saving mode restricts or delays the execution of one or more work items performed by the wearable device.

18. The wearable device according to claim 1, wherein the removable battery component is configured to be charged via a wireless connection.

19. The wearable device according to claim 17, wherein the request to enter the power-saving mode is sent upon detection of one or more power-saving criteria.

20. The wearable device according to claim 19, wherein one or more power-saving criteria include the tracking device component not being connected to a Wireless Local Area Network ("WLAN").

* * * * *